United States Patent
Kwon et al.

(10) Patent No.: US 10,038,851 B2
(45) Date of Patent: Jul. 31, 2018

(54) MOBILE TERMINAL AND METHOD OF CONTROLLING THEREFOR

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 174 days.

(21) Appl. No.: 14/956,012

(22) Filed: Dec. 1, 2015

(65) Prior Publication Data

US 2017/0034443 A1  Feb. 2, 2017

(30) Foreign Application Priority Data

Jul. 28, 2015  (KR) .................. 10-2015-0106340

(51) Int. Cl.
*H04N 5/232*  (2006.01)
*H04M 1/725*  (2006.01)
(Continued)

(52) U.S. Cl.
CPC ....... *H04N 5/23293* (2013.01); *G06F 3/0488* (2013.01); *G06F 3/04842* (2013.01); *G06F 17/30244* (2013.01); *H04M 1/72522* (2013.01); *H04N 5/23222* (2013.01); *H04M 1/72586* (2013.01); *H04M 2250/52* (2013.01)

(58) Field of Classification Search
CPC ........... H04N 1/00392; H04N 1/00411; H04N 1/00424; H04N 1/00437; H04N 1/00442; H04N 1/00453; H04N 5/23222; H04N 5/23293; G06F 3/04842; G06F 3/0488
See application file for complete search history.

(56) References Cited

U.S. PATENT DOCUMENTS 6,522,354 B1 * 2/2003 Kawamura ........ H04N 1/00302
                                                      348/231.2
7,038,724 B2 * 5/2006 Satoh ................. H04N 1/00411
                                                      348/231.3
(Continued)

FOREIGN PATENT DOCUMENTS

EP   2 866 131 A1   4/2015
JP   2004-221647 A  8/2004
(Continued)

*Primary Examiner* — Daniel M Pasiewicz
(74) *Attorney, Agent, or Firm* — Birch, Stewart, Kolasch & Birch, LLP

(57) ABSTRACT

A mobile terminal including a display unit; a camera configured to capture a plurality of images; a wireless communication unit configured to obtain location information corresponding to each of the plurality of the images; a memory configured to store at least one of the location information, a date on which each of the plurality of the images is captured and a time at which each of the plurality of the images is captured together with the plurality of the images; and a controller configured to display a group of images having a matching at least one of the location information, the date and the time, in response to a first command, and sequentially arrange the group of images according to a predetermined image quality condition different than the at least one of the location information, the date and the time.

17 Claims, 24 Drawing Sheets

(51) Int. Cl.
*G06F 3/0484* (2013.01)
*G06F 3/0488* (2013.01)
*G06F 17/30* (2006.01)

(56) References Cited

U.S. PATENT DOCUMENTS

| | | | | |
|---|---|---|---|---|
| 7,304,754 | B1* | 12/2007 | Nakamura | H04N 1/00461 358/1.15 |
| 7,593,035 | B2* | 9/2009 | Okamoto | H04N 1/00453 348/207.1 |
| 2003/0151688 | A1* | 8/2003 | Tojo | H04N 1/00453 348/345 |
| 2005/0219367 | A1* | 10/2005 | Kanda | H04N 1/00209 348/207.2 |
| 2006/0017820 | A1* | 1/2006 | Kim | H04N 5/772 348/231.2 |
| 2007/0236729 | A1* | 10/2007 | Yoda | G06F 17/30247 358/1.15 |
| 2010/0310232 | A1* | 12/2010 | Iwase | G11B 27/34 386/241 |
| 2011/0075917 | A1* | 3/2011 | Cerosaletti | G06K 9/036 382/159 |
| 2011/0075930 | A1* | 3/2011 | Cerosaletti | G06K 9/00677 382/190 |
| 2012/0106859 | A1 | 5/2012 | Cheatle | |
| 2012/0278387 | A1* | 11/2012 | Garcia | G06Q 50/01 709/204 |
| 2013/0021368 | A1 | 1/2013 | Lee et al. | |
| 2013/0238724 | A1* | 9/2013 | Cunningham | H04L 51/24 709/206 |
| 2014/0063311 | A1* | 3/2014 | McCauley | H04N 1/00137 348/333.01 |
| 2014/0071323 | A1* | 3/2014 | Yi | G06F 3/04883 348/333.01 |
| 2014/0081976 | A1* | 3/2014 | Mikawa | G06F 17/3028 707/737 |
| 2014/0207617 | A1* | 7/2014 | An | G06Q 30/0641 705/26.61 |
| 2014/0218554 | A1 | 8/2014 | Yang et al. | |
| 2015/0049234 | A1 | 2/2015 | Jung et al. | |
| 2015/0085317 | A1* | 3/2015 | Kim | G06F 3/0488 358/1.15 |
| 2015/0205457 | A1 | 7/2015 | Woo et al. | |
| 2016/0073034 | A1* | 3/2016 | Mukherjee | H04N 5/23293 348/333.11 |

FOREIGN PATENT DOCUMENTS

| | | |
|---|---|---|
| KR | 10-2006-0029908 A | 4/2006 |
| KR | 10-2013-0026541 A | 3/2013 |
| KR | 10-2015-0019791 A | 2/2015 |
| KR | 10-2015-0047032 A | 5/2015 |

\* cited by examiner

FIG. 8
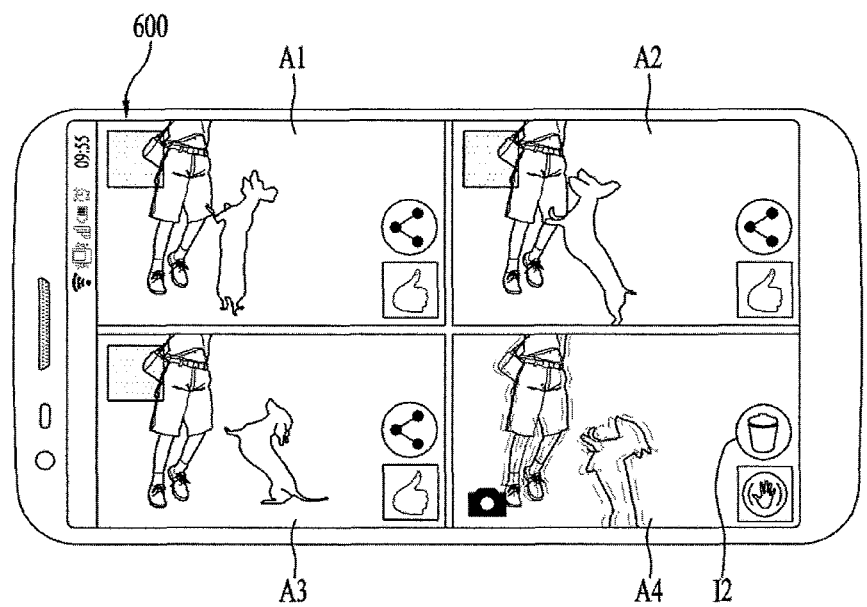
(a)
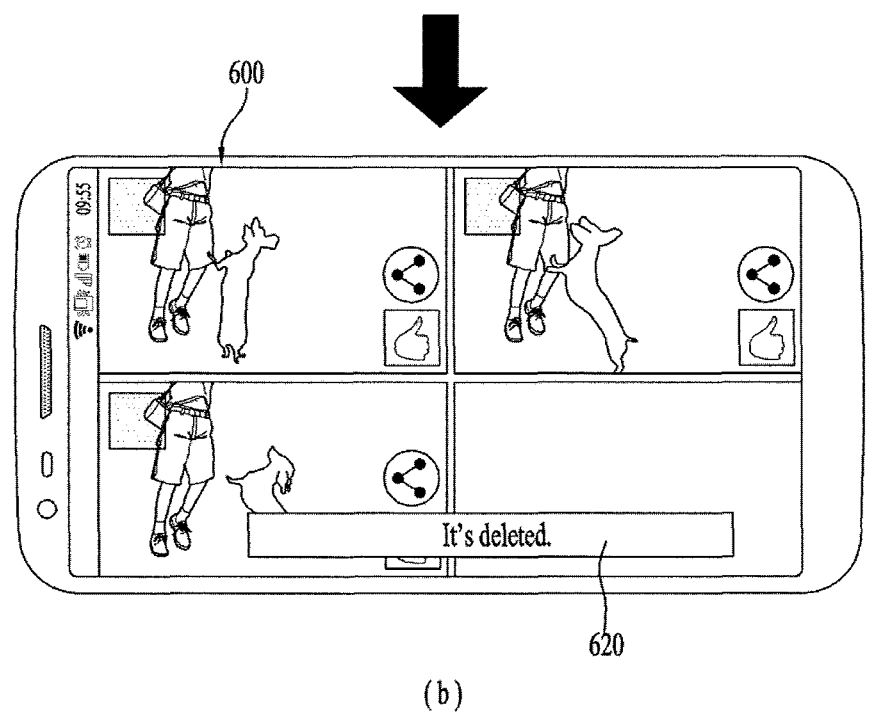
(b)

FIG. 10
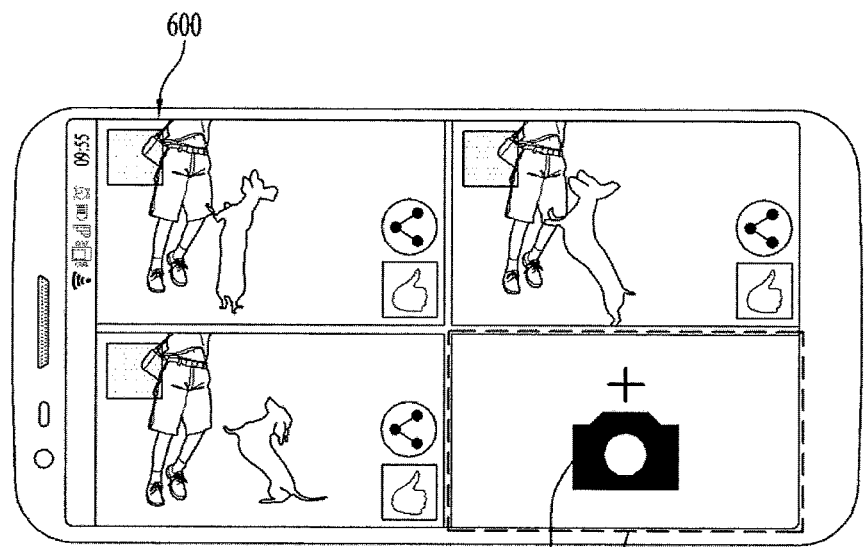
(a)
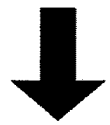
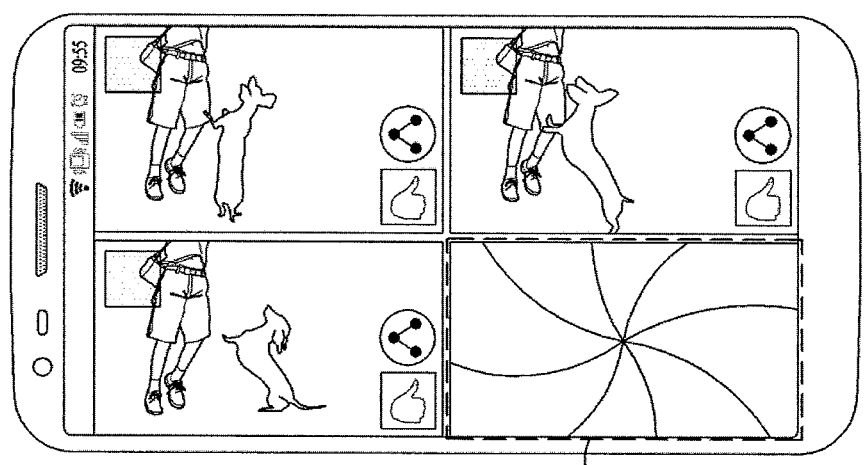
(b)

FIG. 14
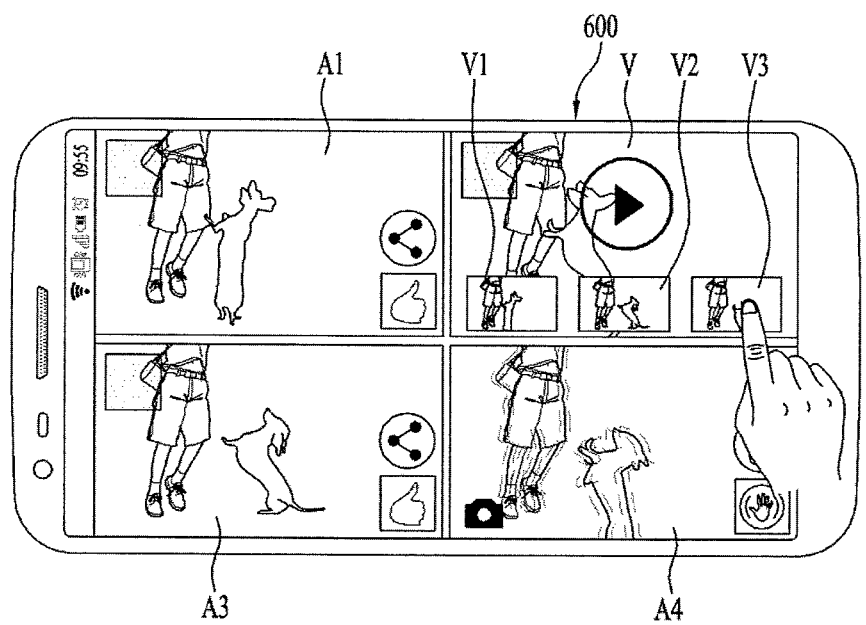
(a)
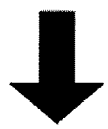
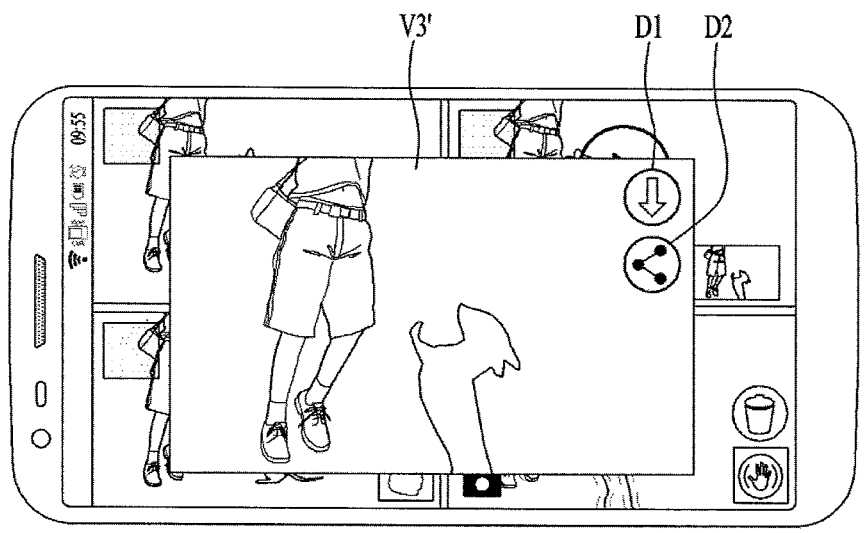
(b)

(a)  (b)

FIG. 24
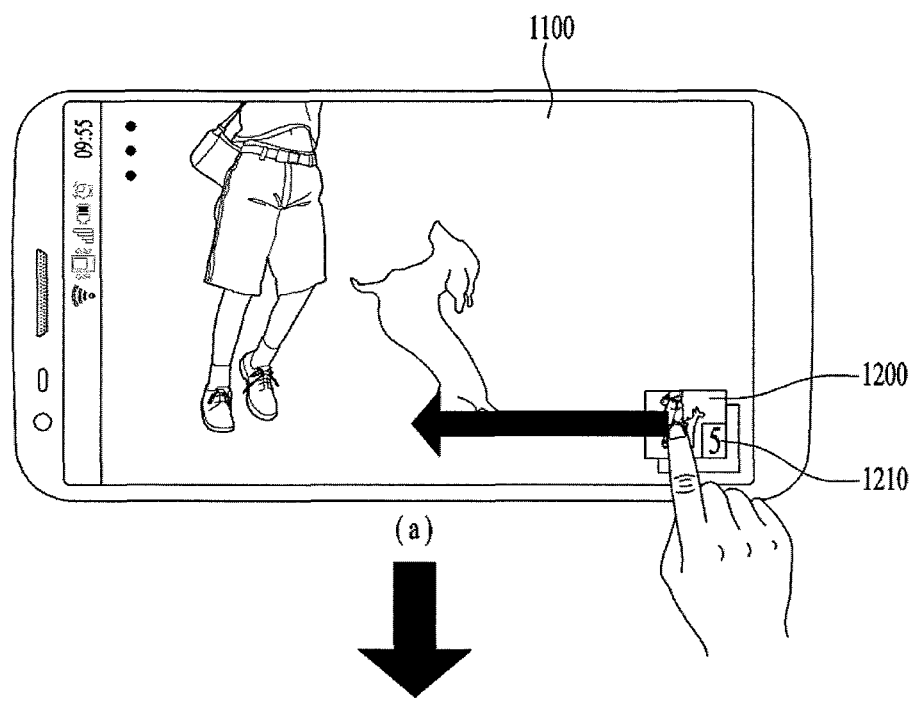
(a)
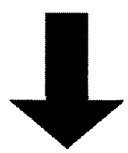
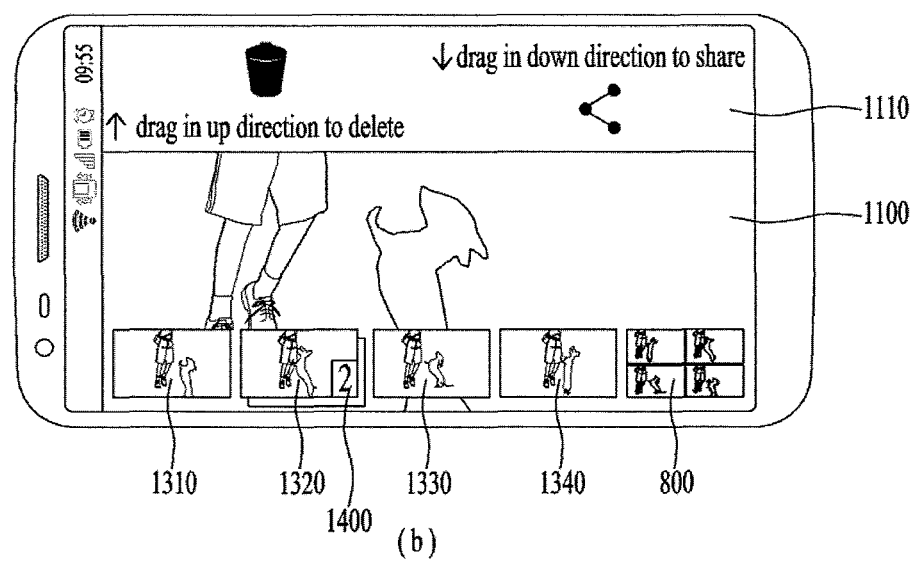
(b)

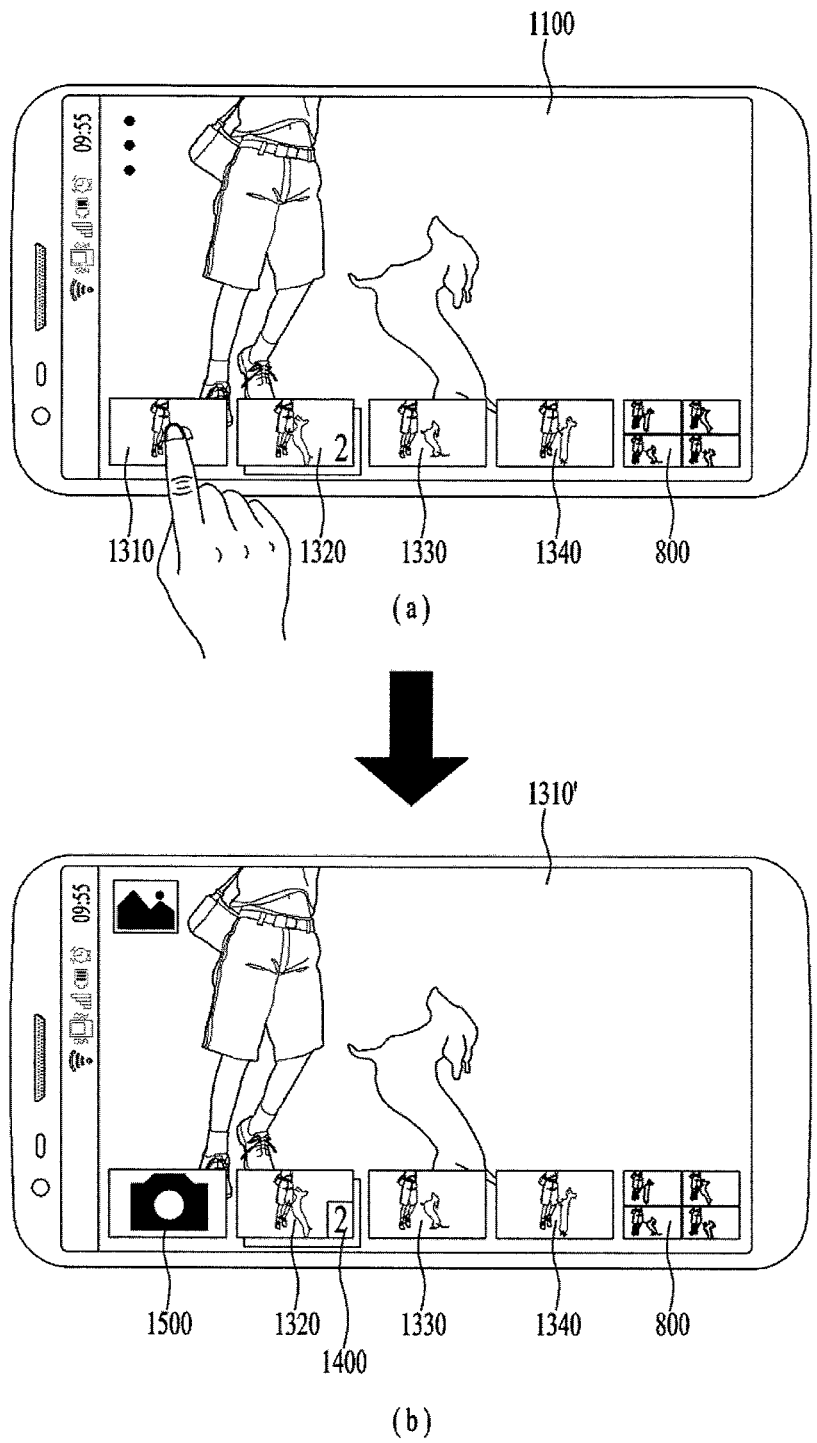

MOBILE TERMINAL AND METHOD OF CONTROLLING THEREFOR

CROSS REFERENCE TO RELATED APPLICATION

This application claims the benefit of the Korean Patent Application No. 10-2015-0106340, filed on Jul. 28, 2015, which is hereby incorporated by reference as if fully set forth herein.

BACKGROUND OF THE INVENTION

Field of the Invention

The present invention relates to a mobile terminal and a method of controlling therefor.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Meanwhile, although a legacy technology includes a technology of automatically categorizing images captured by a mobile terminal according to a location at which the images are captured or time at which the images are captured, the legacy technology does not include a technology of automatically categorizing captured images in consideration of both a capture location and capture date. When the captured images are categorized according to the capture location or capture date, the legacy technology does not include a technology for showing images captured on specific time or images captured at a specific location only.

According to the legacy technology, after the captured images are categorized according to a capture location, capture time or capture date, it is necessary for a user to undergo an additional step to delete or share a specific image among the categorized images. Hence, the user may feel inconvenience.

SUMMARY OF THE INVENTION

Accordingly, an object of the present invention is to address the above-noted and other problems.

A technical task of one embodiment of the present invention is to categorize a plurality of images stored in a memory into at least one of groups using a location at which a plurality of the images are captured, time at which a plurality of the images are captured and a date on which a plurality of the images are captured and display a plurality of images belonging to a specific group among the at least one of groups according to a specific command.

Another technical task of one embodiment of the present invention is to enable a user to intuitively recognize images of which a subject is captured well and images of which a subject is captured unnaturally among images captured on identical timeline, identical date and an identical location.

Still another technical task of one embodiment of the present invention is to enable a user to easily execute a specific function (e.g., a function of deleting an image, a function of sharing an image with an external device or an external server) for at least one or more images among a plurality of images belonging to a specific group.

Technical tasks obtainable from the present invention are non-limited by the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a camera configured to capture a plurality of images, a wireless communication unit configured to obtain location information corresponding to each of a plurality of the images, a memory configured to store at least one of the location information, a date on which each of a plurality of the images is captured and time at which each of a plurality of the images is captured together with a plurality of the images and a controller. In this instance, the controller categorizes a plurality of the images stored in the memory into at least one of groups based on at least one of the location information, the date on which each of a plurality of the images is captured and the time at which each of a plurality of the images is captured and controls a display unit to display a screen including a plurality of images belonging to a specific group among the at least one of groups according to a first command.

To further achieve these objects and other advantages and in accordance with the purpose of the invention, as embodied and broadly described herein, according to a different embodiment, a method of controlling a mobile terminal includes the steps of capturing a plurality of images by a camera, obtaining location information corresponding to each of a plurality of the images, storing at least one of the location information, a date on which each of a plurality of the images is captured and time at which each of a plurality of the images is captured together with a plurality of the images, categorizing a plurality of the images stored in the memory into at least one of groups based on at least one of the location information, the date on which each of a plurality of the images is captured and the time at which each of a plurality of the images is captured and displaying a screen including a plurality of images belonging to a specific group among the at least one of groups according to a first command. In this instance, a plurality of images belonging to a same group among the at least one of groups are matched with each other in terms of at least one of the location information, the date on which each of a plurality of the images is captured and the time at which each of a plurality of the images is captured.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIG. 8 is a diagram illustrating an example of a method for deleting a specific image by selecting a specific indicator from at least one or more indicators displayed on a screen including a plurality of images belonging to a specific group in a mobile terminal according to one embodiment of the present invention;

FIG. 10 is a diagram illustrating an example of a method for adding an image belonging to a specific group on a screen including a plurality of images belonging to a specific group in a mobile terminal according to one embodiment of the present invention;

FIG. 14 is a diagram illustrating an example of a method for displaying a screen including a plurality of images belonging to a specific group and at least one or more videos in a mobile terminal according to one embodiment of the present invention;

FIG. 24 is a diagram illustrating an example of a method for displaying a thumbnail image corresponding to each of a plurality of images belonging to a specific group on a preview image captured by a camera of a mobile terminal according to one embodiment of the present invention; and FIG. 25 is a diagram illustrating an example of a screen which is displayed according to a command for selecting an image from thumbnail images respectively corresponding to a plurality of images belonging to a specific group displayed on a preview image in a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another. When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
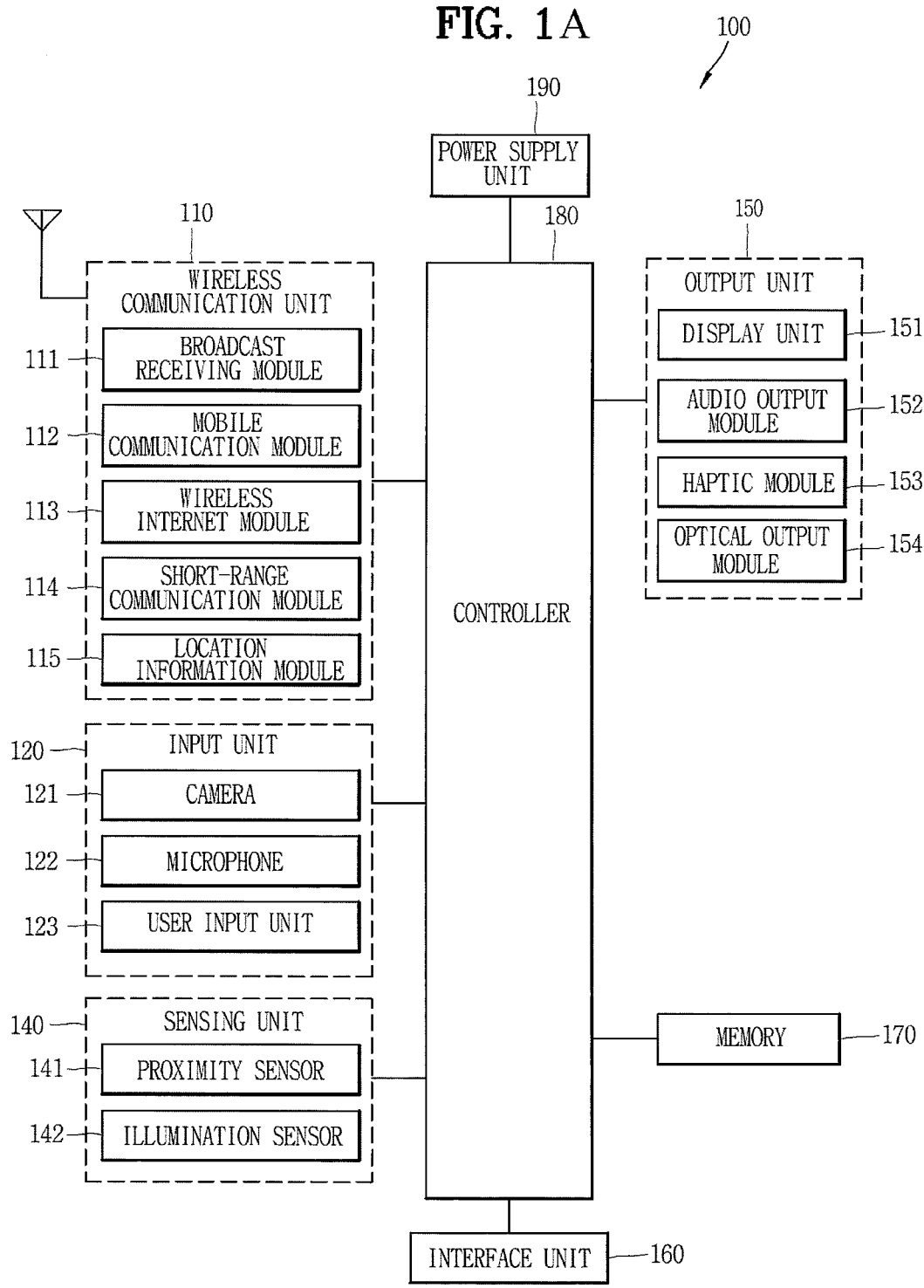
FIG. 1A is a block diagram of a mobile terminal in accordance with the present disclosure.
Figure 1B:
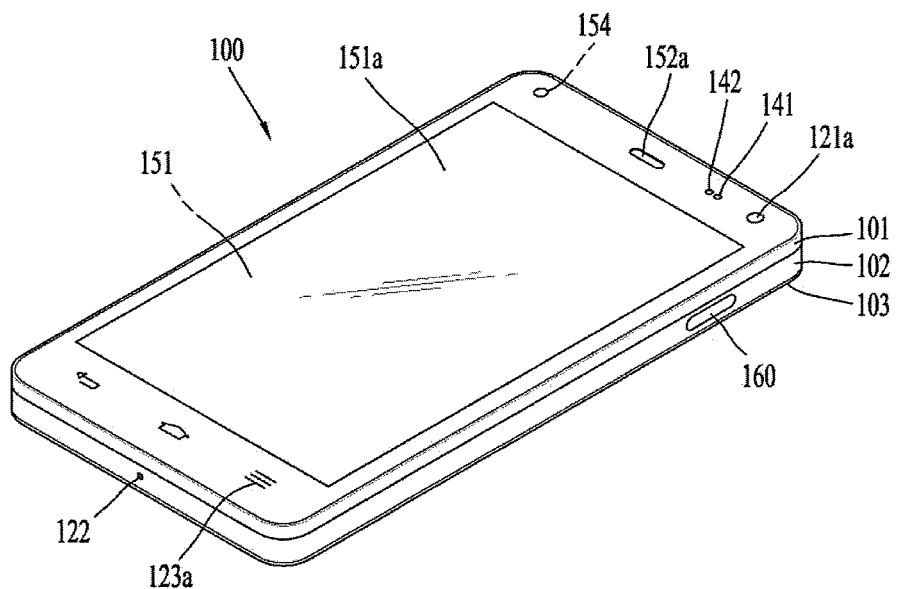
FIGS. 1B and 1C are conceptual views of one example of the mobile terminal, viewed from different directions.
Figure 1C:
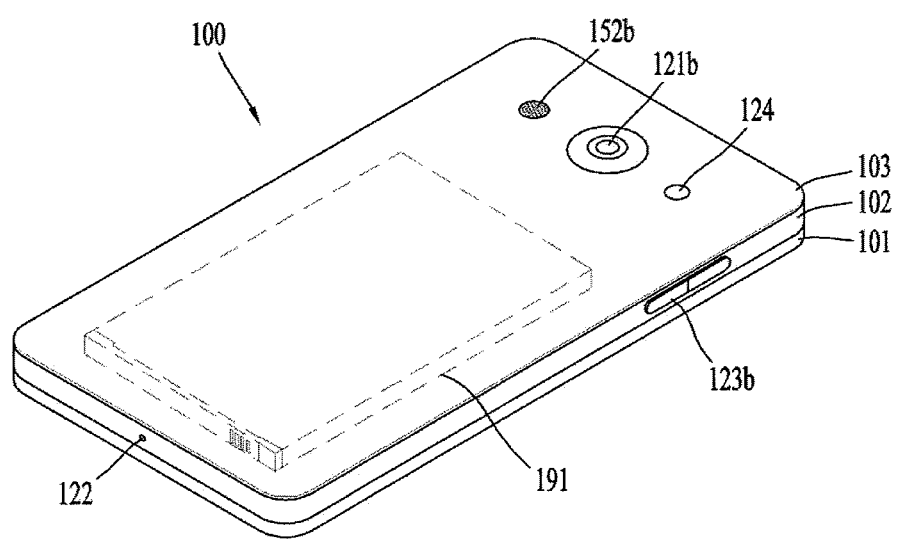

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions. The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, information and the like input or output through the above-mentioned components and/or runs application programs saved in the memory 170, thereby processing or providing a user with appropriate information and/or functions.

The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components mentioned in the foregoing description can cooperatively operate to embody operations, controls or controlling methods of the mobile terminal according to various embodiments of the present invention mentioned in the following description. Moreover, the operations, controls or controlling methods of the mobile terminal can be embodied in the mobile terminal by running at least one or more application programs saved in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112. The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies. Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input.

Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like. A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen. The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition. The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface. If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof. The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display. The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like. The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown. The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Meanwhile, an embodiment of the present invention displays information processed by the mobile terminal using a flexible display. This is described in detail with reference to the accompanying drawings as follows.

Figure 2:
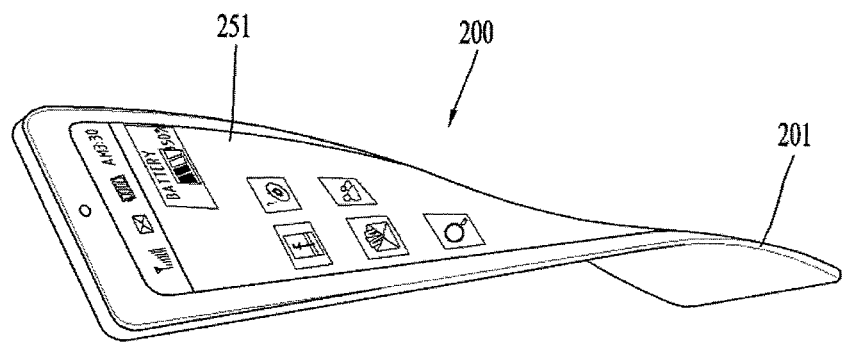
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may be configured to include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which can be deformed as noted previously. The term e-paper may be used to refer to a display technology employing the characteristic of a general ink, and is different from the conventional flat panel display in view of using reflected light. E-paper is generally understood as changing displayed information using a twist ball or via electrophoresis using a capsule.

When the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, when an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. When a touch is received at the flexible touch screen, the controller 180 can execute certain control corresponding to the touch input. In general, the flexible touch screen is configured to sense touch and other input while in both the first and second states. One option is to configure the mobile terminal 200 to include a deformation sensor which senses the deforming of the flexible display unit 251. The deformation sensor may be included in the sensing unit 140.

The deformation sensor may be located in the flexible display unit 251 or the case 201 to sense information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which can be sensed in response to the curving of the flexible display unit or sensed while the flexible display unit 251 is transitioning into, or existing in, the first and second states.

In some embodiments, controller 180 or other component can change information displayed on the flexible display unit 251, or generate a control signal for controlling a function of the mobile terminal 200, based on the information related to the deforming of the flexible display unit 251. Such information is typically sensed by the deformation sensor.

The mobile terminal 200 is shown having a case 201 for accommodating the flexible display unit 251. The case 201 can be deformable together with the flexible display unit 251, taking into account the characteristics of the flexible display unit 251. A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 can be deformed into the second state from the first state by a user command, application command, or the like. In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device can exchange data with (or cooperate with) another mobile terminal 100. In such a device, the wearable device generally has functionality that is less than the cooperating mobile terminal. For instance, the short-range communication module 114 of a mobile terminal 100 may sense or recognize a wearable device that is near-enough to communicate with the mobile terminal. In addition, when the sensed wearable device is a device which is authenticated to communicate with the mobile terminal 100, the controller 180 can transmit data processed in the mobile terminal 100 to the wearable device via the short-range communication module 114, for example. Hence, a user of the wearable device can use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

Figure 3:
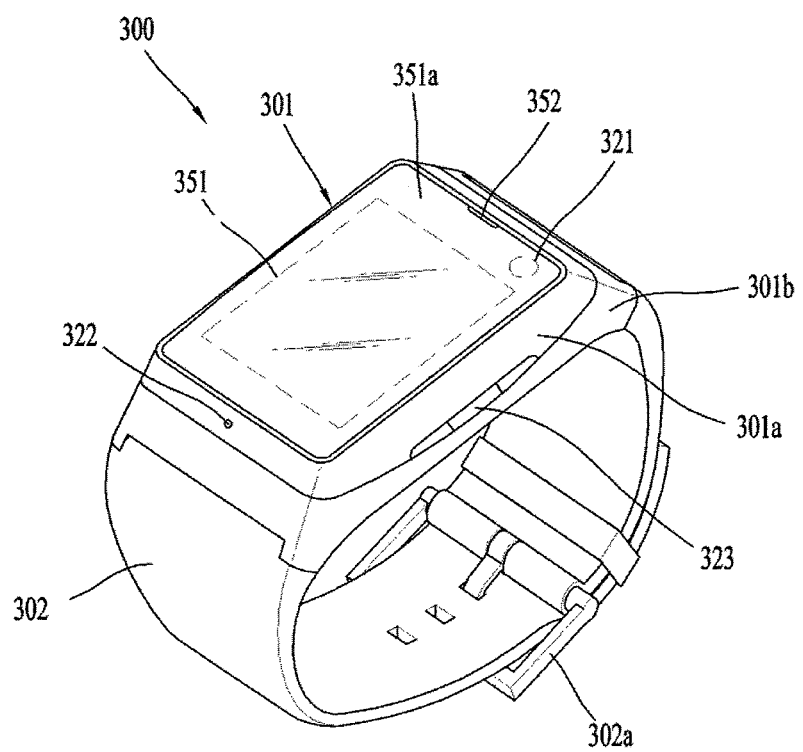
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may be configured to include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 can perform wireless communication, and an antenna for the wireless communication can be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit can function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. When the display unit 351 is implemented as a touch screen, additional function keys may be minimized or eliminated. For example, when the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area. The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
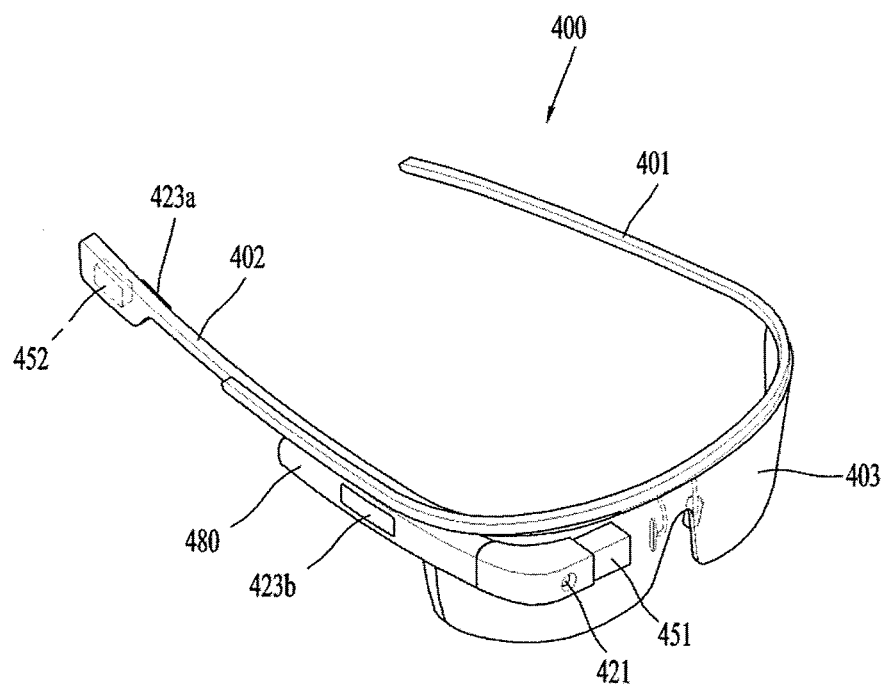
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 can be wearable on a head of a human body and provided with a frame (case, housing, etc.) therefor. The frame may be made of a flexible material to be easily worn. The frame of mobile terminal 400 is shown having a first frame 401 and a second frame 402, which can be made of the same or different materials. In general, mobile terminal 400 may be configured to include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably coupled to the frame part.

The control module 480 controls various electronic components disposed in the mobile terminal 400. The control module 480 may be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes when the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 may project an image into the user's eye using a prism. Also, the prism may be formed from optically transparent material such that the user can view both the projected image and a general visual field (a range that the user views through the eyes) in front of the user. In such a manner, the image output through the display unit 451 may be viewed while overlapping with the general visual field. The mobile terminal 400 may provide an augmented reality (AR) by overlaying a virtual image on a realistic image or background using the display.

The camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which can each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may be configured to produce audio in a general audio output manner or an osteoconductive manner. When the audio output module 452 is implemented in the osteoconductive manner, the audio output module 452 may be closely adhered to the head when the user wears the mobile terminal 400 and vibrate the user's skull to transfer sounds.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals. The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may be configured to include short-range communication techniques such as Bluetooth™, Radio Frequency Identification (RFID), Infrared Data Association (IrDA), Ultra Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

When the NFC module operates in a reader mode, the mobile terminal can read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal can execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode can be effectively utilized in switching data of a small capacity, because an available distance for NFC communication is relatively short.

Further preferred embodiments will be described in more detail with reference to additional drawing figures. It is understood by those skilled in the art that the present features can be embodied in several forms without departing from the characteristics thereof.

In the following, embodiments of the present invention are explained with an example of a mobile terminal 100 shown in FIG. 1A. Yet, it is apparent that a mobile terminal according to one embodiment of the present invention is also implemented by a mobile terminal 200/300/400 shown in FIG. 2 to FIG. 4.

In the following, a method of categorizing a plurality of images stored in a memory into at least one of groups using information on a location at which a plurality of the images are captured, a date on which each of a plurality of the images is captured and time at which each of a plurality of the images is captured and a method of displaying a plurality of images belonging to a specific group among the at least one of more groups on a single screen in a mobile terminal 100 according to one embodiment of the present invention are explained with reference to FIGS. 5 to 25.

Figure 5:
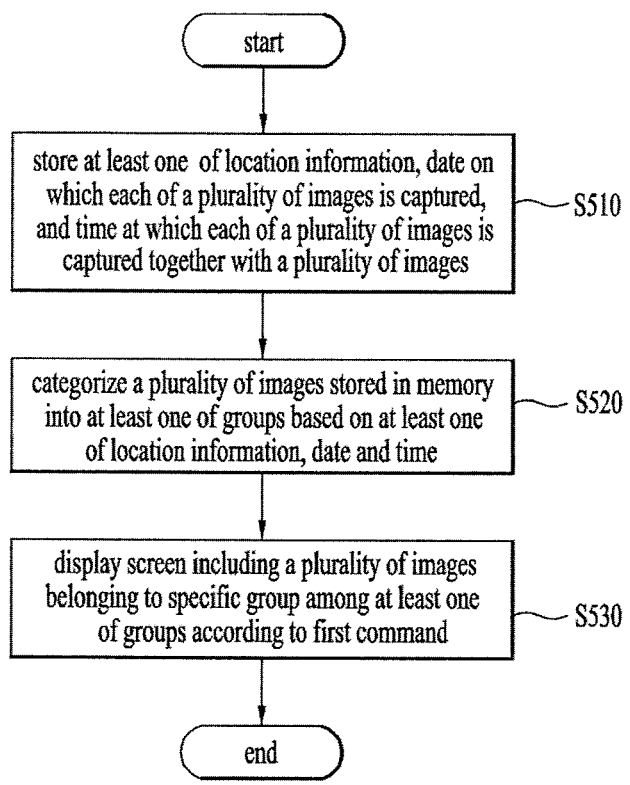
FIG. 5 is a flowchart illustrating an example of a method for categorizing images matched with at least one or more images captured by a camera of a mobile terminal in terms of at least one of location information, a date and time into a same group and a method of displaying a plurality of images belonging to a specific group on a single screen according to one embodiment of the present invention.

FIG. 5 is a flowchart illustrating an example of a method for categorizing images matched with at least one or more images captured by a camera of a mobile terminal in terms of at least one of location information, a date and time into a same group and a method of displaying a plurality of images belonging to a specific group on a single screen according to one embodiment of the present invention.

According to the present embodiment, the controller 180 can control a camera 121 to capture a plurality of images. The controller 180 can control the wireless communication unit 110. Specifically, the controller 180 can control the location information module 115 to obtain location information corresponding to each of a plurality of the images when a plurality of the images are captured via the camera 121. In this instance, the location information module 115 is a module for obtaining a location (or current location) of a mobile terminal. A representative example of the location information module corresponds to a GPS (global positioning system) module or a Wi-Fi (wireless fidelity) module.

For instance, if the GPS module is utilized, a mobile terminal can obtain a location of the mobile terminal using a signal transmitted from a GPS satellite. As a different example, if the Wi-Fi module is utilized, the mobile terminal can obtain the location of the mobile terminal based on information of a wireless AP (access point) configured to transceive a radio signal with the Wi-Fi module. If necessary, the location information module 115 can alternatively or additionally perform a prescribed function of a different module of the wireless communication unit 110 to obtain data on the location of the mobile terminal. The location information module 115 is a module for obtaining a location (or current location) of the mobile terminal and may be non-limited by a module directly calculating or obtaining the location of the mobile terminal.

The controller 180 can store at least one of the obtained location information, a date on which each of a plurality of the images is captured and time at which each of a plurality of the images is captured in the memory 170 together with a plurality of the images (S510). Specifically, when a plurality of the images are captured via the camera 121, the controller 180 can recognize time and a date on which each of a plurality of the images is captured. And, the controller 180 can store not only the location information obtained via the location information module 115 but also the obtained date and the obtained time in the memory 170 together with a plurality of the captured images.

For instance, if a first image among a plurality of the images corresponds to an image captured at the Seoul station on 1:00 P.M. January first, when the first image is stored in the memory 170, the controller 180 can store information indicating that the first image is captured at the Seoul station on 1:00 P.M. January first in the memory together with the first image. Hence, the controller 180 can recognize at least one of information on the location at which the image is captured, time at which the image is captured and a date on which the image is captured using the information.

The controller 180 can categorize a plurality of the images stored in the memory 170 into at least one of groups based on at least one of location information, a date and time (S520). Specifically, the controller 180 can extract a plurality of images of which the location information is matched with each other from a plurality of the images. Subsequently, the controller 180 can extract images of which the captured date is identical to each other from a plurality of the extracted images. The controller 180 can categorize at least one or more images of which the capture time of each of the extracted images is matched into a same group based on the captured time among a plurality of the extracted images. In particular, a plurality of images belonging to a same group among the at least one of groups may have at least one of the matched location information, the matched captured date and the matched captured time.

As an example, assume that 10 images captured at the Seoul station on 1:00 P.M. to 2:00 P.M. Jan. 1, 2015 and 20 images captured in L.A. on 3:00 P.M. to 4:00 P.M. Jan. 1, 2015 are stored in the memory 170. In this instance, the controller 180 can categorize the 10 images to be belonged to a first group and categorize the 20 images to be belonged to a second group different from the first group.

The controller 180 can control a display unit 151 to display a screen including a plurality of images belonging to a specific group among at least one of groups according to a first command (S530). In the step S530, the screen may correspond to a screen including a plurality of images belonging to a specific group among the at least one of groups. In particular, the controller 180 can control the display unit 151 to display all of a plurality of the images belonging to the specific group on a single screen according to the first command. This will be described later in more detail with reference to FIG. 6.

In the step of S530, when a first image of which the captured time is the earliest (i.e., a firstly captured image) or a second image of which the captured time is the latest (i.e., a lastly captured image) among a plurality of the images belonging to the specific group is displayed, the first command may correspond to a touch command touching a random point of the first image or the second image and dragging the touch in a specific direction.

As an example, assume that 10 images captured at the Seoul station on 1:00 P.M. to 2:00 P.M. Jan. 1, 2015 belong to the specific group. In this instance, when a first image of which captured time is the earliest among the 10 images is displayed, if a touch command touching a random point of the first image and dragging the touch in the left direction is detected, the controller 180 can control the display unit 151 to display a screen including the 10 images belonging to the specific group.

As a different example, assume that 10 images captured at the Seoul station on 1:00 P.M. to 2:00 P.M. Jan. 1, 2015 belong to the specific group. In this instance, when a second image of which captured time is the latest among the 10 images is displayed, if a touch command touching a random point of the second image and dragging the touch in the right direction is detected, the controller 180 can control the display unit 151 to display a screen including the 10 images belonging to the specific group.

According to one embodiment, when the first image of which the captured time is the earliest or the second image of which the captured time is the latest among a plurality of the images belonging to the specific group is displayed, the controller 180 can control the display unit 151 to display a first indicator including a thumbnail image corresponding to each of a plurality of the images belonging to the specific group on a partial region of the first image or the second image. Further, in the step S530, the first command may correspond to a touch command for selecting the first indicator.

As an example, assume that 10 images captured at the Seoul station on 1:00 P.M. to 2:00 P.M. Jan. 1, 2015 belong to the specific group. In this instance, when a first image of which the captured time is the earliest among a plurality of the images is displayed, the controller 180 can control the display unit 151 to display a first indicator including thumbnail images of each of a plurality of the images on a region of the first image. Subsequently, the controller 180 can control the display unit 151 to display a screen including the 10 images belonging to the specific group according to a touch command selecting the first indicator.

As a different example, assume that 10 images captured at the Seoul station on 1:00 P.M. to 2:00 P.M. Jan. 1, 2015 belong to the specific group. In this instance, when a second image of which the captured time is the latest among a plurality of the images is displayed, the controller 180 can control the display unit 151 to display a first indicator including thumbnail images of each of a plurality of the images on a region of the second image. The first indicator can utilize all or a part of the thumbnail images of the 10 images. Subsequently, the controller 180 can control the display unit 151 to display a screen including the 10 images belonging to the specific group according to a touch command selecting the first indicator.

Figure 6:
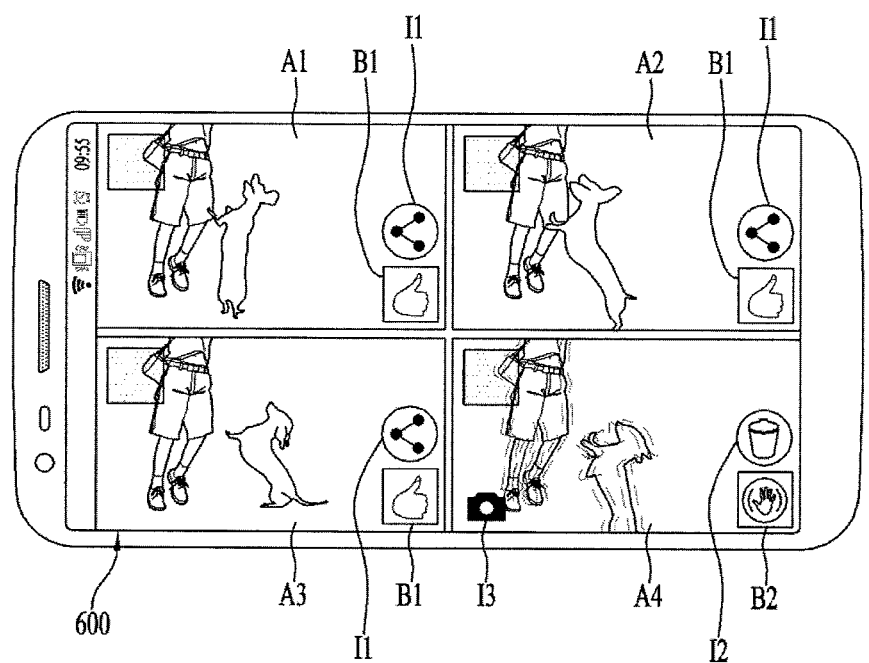
FIG. 6 is a diagram illustrating an example of a screen including a plurality of images belonging to a specific group among at least one of groups in a mobile terminal according to one embodiment of the present invention.

In the following, the screen, which is displayed according to the first command mentioned earlier in the step S530 in FIG. 5, is explained in more detail with reference to FIG. 6. In particular, FIG. 6 is a diagram illustrating an example of a screen including a plurality of images belonging to a specific group among at least one of groups in a mobile terminal according to one embodiment of the present invention.

In the present embodiment, a screen including a plurality of images belonging to a specific group, which are displayed according to a first command mentioned earlier in the step S530 in FIG. 5, is explained in more detail. Referring to FIG.

6, a screen 600, which is displayed according to the first command, can include a plurality of images A1/A2/A3/A4 belonging to a specific group. In this instance, a plurality of the images A1/A2/A3/A4 belonging to the specific group may correspond to images of which at least one of location information corresponding to each of a plurality of the images A1/A2/A3/A4, a date on which each of a plurality of the images A1/A2/A3/A4 is captured and time at which each of a plurality of the images A1/A2/A3/A4 is captured is matched with a plurality of the images. In particular, a plurality of the images A1/A2/A3/A4 may correspond to images captured on a same date, a same location and a timeline matched with each other (i.e., within a predetermined time range).

The controller 180 can control a display size of each of a plurality of the images displayed on the screen 600 according to the number of a plurality of the images included in the specific group. In particular, the controller 180 can control the display size of each of a plurality of the images to display all of a plurality of the images included in the specific group on the screen 600. Hence, a user can check all images included in the specific group at a time via the screen 600.

The controller 180 can determine a position of the screen 600 on which each of a plurality of the images belonging to the specific group is displayed according to a predetermined condition. Specifically, the controller 180 can determine a position on which a plurality of the images are displayed to enable a user to recognize that images of which a subject is captured well among a plurality of the images belonging to the specific group are sequentially arranged on the screen 600. In this instance, the image of which the subject is captured well may correspond to an image that the subject is clear, a focus on the subject is in focus and the subject does not close their eyes. Hence, a user can immediately recognize a picture of which a subject is captured well and a picture of which a subject is captured unnaturally via a position of a plurality of the images A1/A2/A3/A4 arranged at the screen 600. For example, the predetermined condition can correspond to an image quality or image characteristic different than the location information, time, and/or date.

For instance, assume that a first image A1, a second image A2 and a third image A3 correspond to images of which a subject is clear and the images of which a focus on the subject is in focus and assume that a fourth image A4 corresponds to an image of which a subject is unclear (e.g., a picture of which a focus on the subject is out of focus) among a plurality of the images belonging to the specific group. In this instance, the controller 180 can control the display unit 151 to sequentially arrange the first image A1, the second image A2 and the third image A3 on the screen 600 and arrange the fourth image A4 after the third image A3.

The controller 180 can control the display unit 151 to output a first indicator I1 corresponding to a function of sharing at least one or more images with an external server or an external device on the at least one or more images satisfying a predetermined condition among a plurality of images included on the screen. Specifically, the at least one or more images satisfying the predetermined condition may correspond to an image of which a subject is clear, the image of which a focus on the subject is in focus and the image of which the subject does not close their eyes.

For instance, assume that a first image A1, a second image A2 and a third image A3 correspond to images of which a subject is clear and the images of which a focus on the subject is in focus and assume that a fourth image A4 corresponds to an image of which a subject is unclear (e.g., a picture of which a focus on the subject is out of focus) among a plurality of the images belonging to the specific group. In this instance, the controller 180 can control the display unit 151 to output the first indicators I1 on the first image A1, the second image A2 and the third image A3. Subsequently, the controller 180 receives a command for selecting a first indicator I1 from at least one or more first indicators I1 and can then share an image corresponding to the selected first indicator I1 with an external server or an external device. This will be explained later in more detail with reference to FIG. 7.

The controller 180 can control the display unit 151 to output a first image data B1 indicating that the at least one or more images satisfy a predetermined condition on the at least one or more images satisfying the predetermined condition. For instance, assume that a first image A1, a second image A2 and a third image A3 correspond to images of which a subject is clear and the images of which a focus on the subject is in focus and assume that a fourth image A4 corresponds to an image of which a subject is unclear (e.g., a picture of which a focus on the subject is out of focus) among a plurality of the images belonging to the specific group. In this instance, the controller 180 can control the display unit 151 to output the first image data B1 on the first image A1, the second image A2 and the third image A3 to indicate that the subject corresponds to a clear image. Hence, a user can intuitively recognize that an image including the first image data B1 corresponds to a picture of which a subject is captured well.

Meanwhile, the controller 180 can control the display unit 151 to output at least one of a second indicator 12 corresponding to a function of deleting at least one or more images and a third indicator corresponding to a function of recapturing the at least one or more images on the at least one or more images not satisfying a predetermined condition among a plurality of the images included in the screen. Specifically, the at least one or more images not satisfying the predetermined condition may correspond to one of an image of which a subject is not clear, an image of which a focus on a subject is out of focus and an image of which a subject closes their eyes.

For instance, assume that a first image A1, a second image A2 and a third image A3 correspond to images of which a subject is clear and the images of which a focus on the subject is in focus and assume that a fourth image A4 corresponds to an image of which a subject is unclear (e.g., a picture of which a focus on the subject is out of focus) among a plurality of the images belonging to the specific group. In this instance, the controller 180 can control the display unit 151 to output at least one of the second indicator 12 and the third indicator 13 on the fourth image A4.

The controller 180 can delete an image corresponding to the selected second indicator 12 according to a command for selecting an indicator 12 from the output at least one or more indicators 12. And, the controller 180 can recapture an image corresponding to the selected third indicator 13 according to a command for selecting an indicator 13 from the output at least one or more indicators 13. This will be described later in more detail with reference to FIG. 8 and FIG. 9.

Subsequently, the controller 180 can control the display unit 151 to output a second image data B2 indicating that the at least one or more images do not satisfy a predetermined condition on the at least one or more images not satisfying the predetermined condition. For instance, assume that a first image A1, a second image A2 and a third image A3 correspond to images of which a subject is clear and the images of which a focus on the subject is in focus and assume that a fourth image A4 corresponds to an image of which a subject is unclear (e.g., a picture of which a focus on the subject is out of focus) among a plurality of the images belonging to the specific group. In this instance, the controller 180 can control the display unit 151 to output second image data B2 indicating an image of which a subject is unclear on the fourth image A4. Hence, a user can intuitively recognize that an image including the second image data B2 corresponds to an image of which a subject is captured unnaturally.

According to the present embodiment, a user can check a plurality of images, which are captured on a same date, a same timeline and a same location, belonging to a specific group via a single screen at a time. And, a user can easily share an image satisfying a predetermined condition among a plurality of the images with an external server or an external device. Further, a user can easily delete or recapture an image not satisfying a predetermined condition among a plurality of the images.

Figure 7:
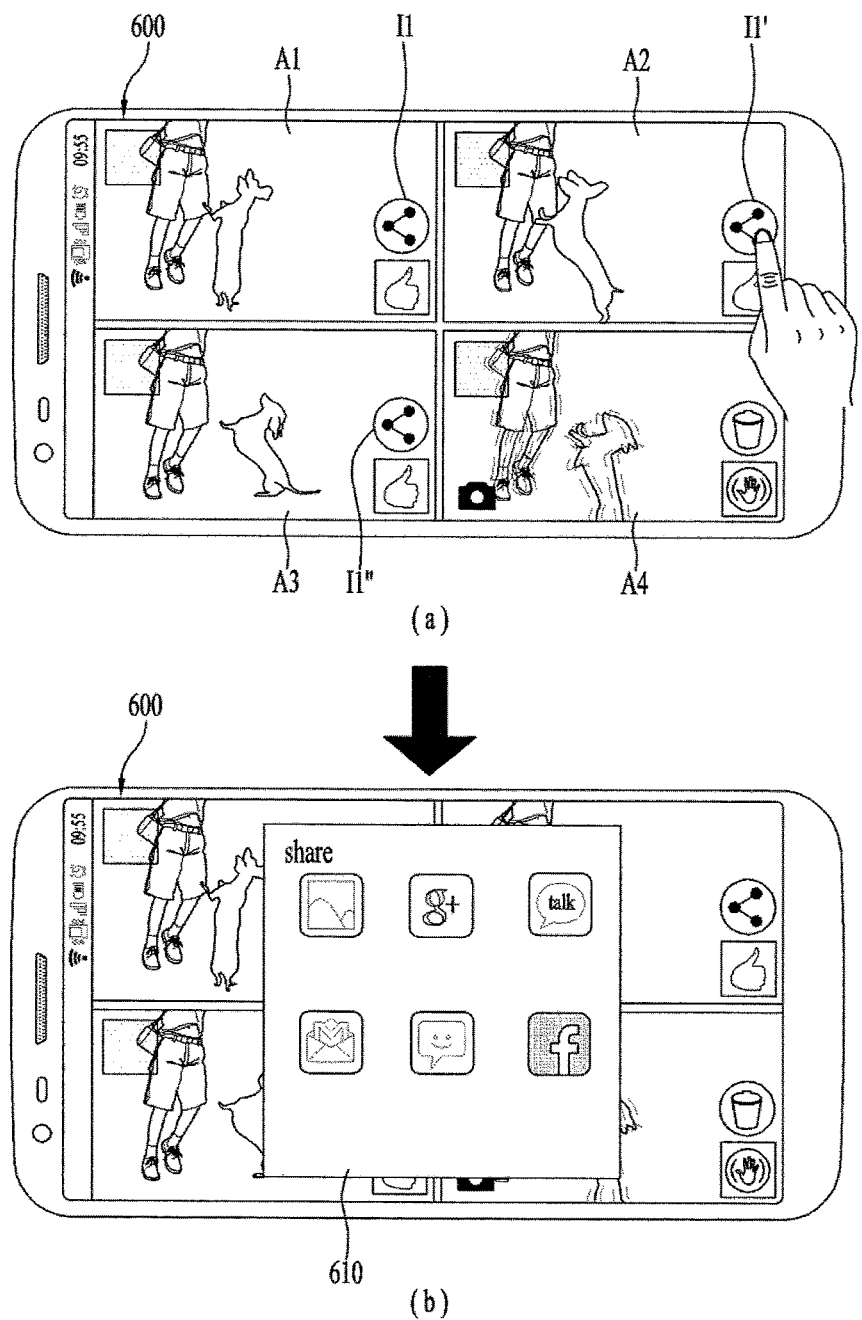
FIG. 7 is a diagram illustrating an example of a method for sharing a specific image with an external server or an external device by selecting a specific indicator from at least one or more indicators displayed on a screen including a plurality of images belonging to a specific group in a mobile terminal according to one embodiment of the present invention.

FIG. 7 is a diagram illustrating an example of a method for sharing a specific image with an external server or an external device by selecting a specific indicator from at least one or more indicators displayed on a screen including a plurality of images belonging to a specific group in a mobile terminal according to one embodiment of the present invention. In relation to FIG. 7, contents overlapped with what is mentioned earlier in FIG. 6 are not explained again. In the following, the difference between FIG. 6 and FIG. 7 is mainly explained.

In the present embodiment, a method for a user to share a specific image with an external server or an external device using a screen including a plurality of displayed images belonging to a specific group according to a first command, which is mentioned earlier in FIG. 6, is explained in more detail.

Referring to FIG. 7 (a), the controller 180 can control the display unit 151 to display first indicators I1/I1'/I1" corresponding to a function of sharing at least one or more images with an external server or an external device on the at least one or more images satisfying a predetermined condition among a plurality of images A1/A2/A3/A4 included in the screen 600.

Referring to FIG. 7 (b), if a command for selecting a first indicator (e.g., an indicator I1' corresponding to a specific image A2) from first indicators I1/I1'/I1" displayed on the screen 600 of FIG. 7 (a) is detected, the controller 180 can control the display unit 151 to display a selection window 610 of an application related to a function of sharing the specific image A2 corresponding to the selected first indicator I1' with an external server or an external device according to the command.

For instance, the selection window 610 can include an icon corresponding to each of at least one or more applications performing a function of sharing the specific image A2 with an external server and an icon corresponding to each of at least one or more applications performing a function of sharing the specific image A2 with an external device. If a user selects an icon from the at least one or more icons displayed on the selection window 610, the user can share the specific image A2 with an external server and can share the specific image A2 with an external device. According to the present embodiment, a user can easily share an image of which a subject is captured well among a plurality of images belonging to a specific group with an external server or an external device.

FIG. 8 is a diagram illustrating an example of a method for deleting a specific image by selecting a specific indicator from at least one or more indicators displayed on a screen including a plurality of images belonging to a specific group in a mobile terminal according to one embodiment of the present invention. In relation to FIG. 8, contents overlapped with what is mentioned earlier in FIG. 6 are not explained again. In the following, the difference between FIG. 6 and FIG. 8 is mainly explained.

In the present embodiment, a method for a user to delete a specific image using a screen including a plurality of displayed images belonging to a specific group according to a first command, which is mentioned earlier in FIG. 6, is explained in more detail. Referring to FIG. 8 (a), the controller 180 can control the display unit 151 to display a second indicator I2 corresponding to a function of deleting at least one or more images on the at least one or more images not satisfying a predetermined condition among a plurality of images A1/A2/A3/A4 included in the screen 600.

Referring to FIG. 8 (b), the controller 180 can delete a specific image A4 corresponding to the second indicator I2 according to a command for selecting the second indicator I2 displayed on the screen 600 of FIG. 8 (a). When the specific image A4 corresponding to the selected second indicator I2 is deleted, the controller 180 can control the display unit 151 to display a message 620 indicating that the specific image A4 is deleted. In particular, the controller 180 deletes the specific image A4 corresponding to the second indicator I2 from the memory 170 according to the command for selecting the second indicator I2 and can control the display unit 151 to make the specific image A4 to be disappeared from the screen 600 as well.

Although the present embodiment explains an example when there exists an image not satisfying the predetermined condition, there may exist a plurality of images not satisfying the predetermined condition. For instance, if a plurality of images do not satisfy a predetermined condition, the controller 180 can control the display unit 151 to display at least one or more second indicators corresponding to a function of deleting each of a plurality of the images on each of a plurality of the images. Subsequently, if a command for selecting a specific second indicator from the at least one or more second indicators is detected, the controller 180 can delete an image corresponding to the selected specific second indicator from the memory 170 according to the command.

According to the present embodiment, a user can easily delete an image of which a subject is captured unnaturally from a plurality of images belonging to the specific group. Meanwhile, according to one embodiment of the present invention, it can recapture an image not satisfying the predetermined condition. This will be described in more detail with reference to FIG. 9 in the following.

Figure 9:
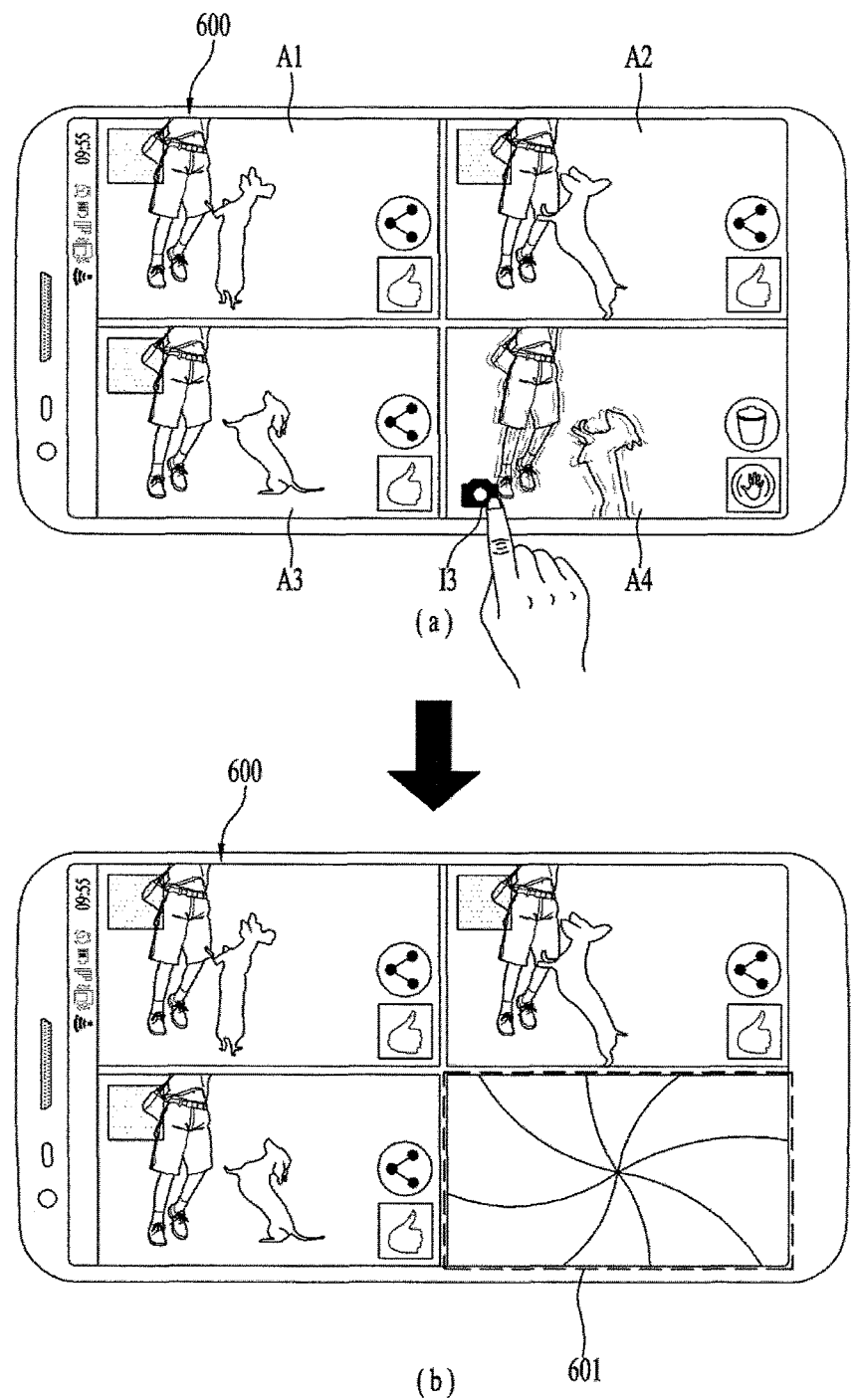
FIG. 9 is a diagram illustrating an example of a method for recapturing a specific image by selecting a specific indicator from at least one or more indicators displayed on a screen including a plurality of images belonging to a specific group in a mobile terminal according to one embodiment of the present invention.

FIG. 9 is a diagram illustrating an example of a method for recapturing a specific image by selecting a specific indicator from at least one or more indicators displayed on a screen including a plurality of images belonging to a specific group in a mobile terminal according to one embodiment of the present invention. In relation to FIG. 9, contents overlapped with what is mentioned earlier in FIG. 6 are not explained again. In the following, the difference between FIG. 6 and FIG. 9 is mainly explained.

In the present embodiment, a method for a user to recapture a specific image using a screen including a plurality of displayed images belonging to a specific group according to a first command, which is mentioned earlier in FIG. 6, is explained in more detail. Referring to FIG. 9 (*a*), the controller 180 can control the display unit 151 to display a third indicator 13 corresponding to a function of recapturing at least one or more images on the at least one or more images A4 not satisfying a predetermined condition among a plurality of images A1/A2/A3/A4 included in the screen 600.

Referring to FIG. 9 (*b*), the controller 180 can recapture a specific image A4 corresponding to the third indicator 13 according to a command for selecting the third indicator 13 displayed on the screen of FIG. 9 (*a*). Specifically, the controller 180 can activate the camera 121 according to the command for selecting the third indicator 13. The controller 180 can control the display unit 151 to display a preview image obtained by the activated camera 121 on a specific position 601 of the screen 600. In this instance, the specific position may correspond to a position of the screen 600 on which the image A4 corresponding to the selected third indicator 13 of FIG. 9 (*a*) is displayed. Hence, a user can recapture an image while checking images A1/A2/A3 among a plurality of images belonging to a specific group except the image A4 corresponding to the third indicator.

According to embodiment, the controller 180 activates the camera 121 according to the command for selecting the third indicator 13 and may be then able to control the display unit 151 to display a preview image obtained by the activated camera 121 on a whole screen. In particular, the controller 180 can control the display unit 151 to make the screen 600 to be disappeared and display the preview image according to the command for selecting the third indicator 13. A user can make the screen 600 to be displayed again by inputting a specific command when the preview image is displayed on a whole screen and can control the display unit 151 to display thumbnail images of a plurality of images stored in the memory by executing a gallery application.

Meanwhile, according to one embodiment of the preset invention, the controller 180 can output an indicator for adding an image to a screen 600 including a plurality of images belonging to a specific group and the controller 180 can add an image belonging to the specific group via the indicator. This will be described in more detail with reference to FIG. 10 in the following.

FIG. 10 is a diagram illustrating an example of a method for adding an image belonging to a specific group on a screen including a plurality of images belonging to the specific group in a mobile terminal according to one embodiment of the present invention. In relation to FIG. 10, contents overlapped with what is mentioned earlier in FIG. 6 are not explained again. In the following, the difference between FIG. 6 and FIG. 10 is mainly explained.

In the present embodiment, a method for a user to add a specific image belonging to a specific group using a screen including a plurality of displayed images belonging to the specific group according to a first command, which is mentioned earlier in FIG. 6, is explained in more detail. Referring to FIG. 10 (*a*), the controller 180 can control the display unit 151 to display a specific indicator 14 corresponding to a function of adding an image belonging to the specific group on a specific region 602 of the screen 600. In this instance, the specific region 602 corresponds to a region positioned at the bottom right of the screen 600 and may correspond to a region lastly seen by a user when the user sees the screen 600.

Referring to FIG. 10 (*b*), the controller 180 can control the display unit 151 to display a preview image obtained by the camera 121 on the specific region 602 on which the specific indicator 14 used to be displayed according to a touch command for selecting the specific indicator 14. Specifically, the controller 180 can activate the camera 121 according to a command for selecting the specific indicator 14. The controller 180 can control the display unit 151 to display a preview image obtained by the activated camera 121 on a specific position of the screen 600. In this instance, the specific position may correspond to a position corresponding to a specific region 602 on which the selected specific indicator 14 used to be displayed in the screen 600 in FIG. 10 (*a*). Hence, a user can newly add an image belonging to the specific group while checking images belonging to the specific group.

According to an embodiment, the controller 180 activates the camera 121 according to a command for selecting the specific region 602 and can control the display unit 151 to display a preview image obtained by the activated camera 121 on a whole screen. In particular, the controller 180 can control the display unit 151 to make the screen 600 to be disappeared and display the preview image according to the command for selecting the specific region 602. A user can make the screen 600 to be displayed again by inputting a specific command when the preview image is displayed on a whole screen and can control the display unit 151 to display thumbnail images of a plurality of images stored in the memory by executing a gallery application.

Meanwhile, according to one embodiment of the preset invention, if there is no image satisfying a predetermined condition among a plurality images belonging to the specific group, the controller 180 can recapture at least one or more images. This will be described in more detail with reference to FIG. 11 in the following.

Figure 11:
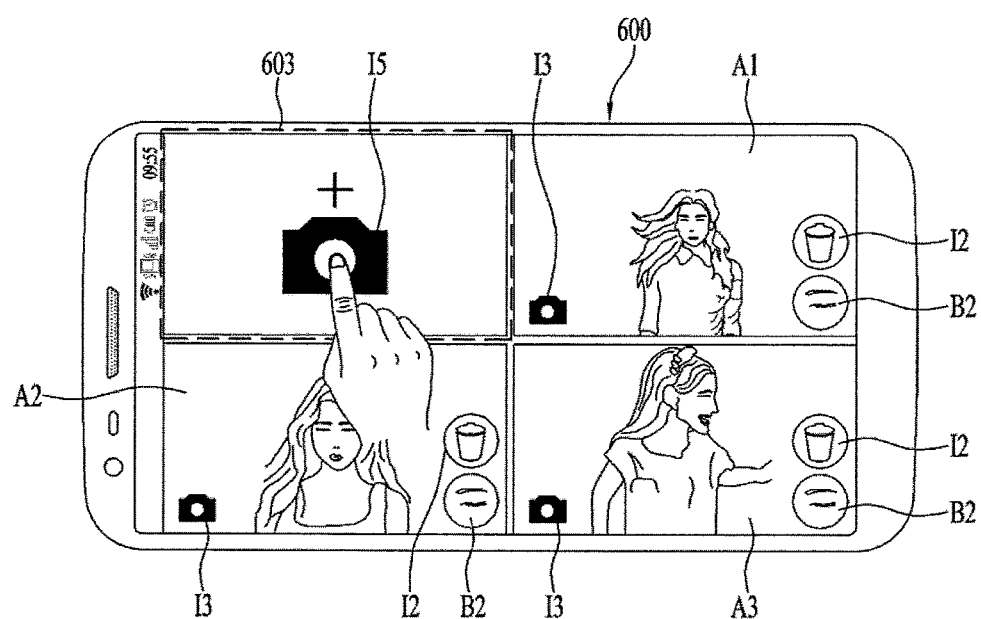
FIG. 11 is a diagram illustrating an example of a method for recapturing at least one or more images when there is no image satisfying a predetermined condition among a plurality of images belonging to a specific group in a mobile terminal according to one embodiment of the present invention.

FIG. 11 is a diagram illustrating an example of a method for recapturing at least one or more images when there is no image satisfying a predetermined condition among a plurality of images belonging to a specific group in a mobile terminal according to one embodiment of the present invention. In relation to FIG. 11, contents overlapped with what is mentioned earlier in FIGS. 6, 8 and 9 are not explained again. In the following, a different point is mainly concerned.

In the present embodiment, if there is no image satisfying a predetermined condition among a plurality of images belonging to a specific group, a screen displayed according to a first command, which is mentioned earlier in the step S530 in FIG. 5, is explained in more detail. First of all, according to the present embodiment, the controller 180 can recognize whether there exists an image satisfying a predetermined condition among a plurality images A1/A2/A3 belonging to the specific group. Specifically, at least one or more images satisfying the predetermined condition may correspond to images of which a subject is clear, the images of which a focus on the subject is in focus and the images of which the subject does not close their eyes.

Referring to FIG. 11, if the controller 180 recognizes as there is no image satisfying the predetermined condition among a plurality of the images A1/A2/A3 belonging to the specific group, the controller 180 can control the display unit to display a fifth indicator 15 corresponding to a function of recapturing at least one or more images on a specific region 603 of the screen 600. In this instance, the specific region 603 corresponds to a region positioned at the top left of the screen 600 and may correspond to a region firstly seen by a user when the user sees the screen 600.

The controller 180 can recapture all of a plurality of the images or can add at least one or more images to a plurality of the images belonging to the specific group according to a command for selecting the fifth indicator 15. As an example, the controller 180 can activate a camera 121 according to the command for selecting the fifth indicator 15. The controller 180 can control the display unit 151 to display a preview image obtained by the activated camera 121 on a specific region 603 of the screen 600. The controller 180 can store the captured preview image in the memory 170 according to a capture command for capturing the preview image displayed on the specific region 603. Subsequently, the controller 180 can control the display unit 151 to display the captured image on the screen 600.

As a different example, the controller 180 can activate a camera 121 according to the command for selecting the fifth indicator 15. The controller 180 can control the display unit 151 to display a preview image obtained by the activated camera 121 on a whole region of the screen 600. The controller 180 deletes all of a plurality of the images belonging to the specific group according to a capture command for capturing the preview image displayed on the specific region 603 and can store the captured preview image in the memory 170. Subsequently, the controller 180 can control the display unit 151 to display the captured image on the screen 600.

Meanwhile, when the screen 600 is displayed, since there is no image satisfying the predetermined condition among a plurality of the images A1/A2/A3 belonging to the specific group, the controller 180 can control the display unit 151 to display at least one of a second indicator 12 corresponding to a function of deleting each of a plurality of the images and a third indicator corresponding to a function of recapturing the at least one or more images on a plurality of the images A1/A2/A3 included in the screen 600. Since explanation on this is similar to what is mentioned earlier in FIGS. 8 and 9, detail explanation is omitted at this time.

When the screen 600 is displayed, since there is no image satisfying the predetermined condition among a plurality of the images A1/A2/A3 belonging to the specific group, the controller 180 can control the display unit 151 to output a second image data B2 on a plurality of the images A1/A2/A3 included in the screen 600 to indicate that each of a plurality of the images does not satisfy the predetermined condition. Since explanation on this is similar to what is mentioned earlier in FIG. 6, detail explanation is omitted at this time.

Meanwhile, according to one embodiment of the present invention, if a plurality of identical images exist in a plurality of images belonging to the specific group, the controller 180 can display an image only among a plurality of the identical images and the controller 180 may not display the remaining images. This will be described in more detail with reference to FIG. 12 in the following.

Figure 12:
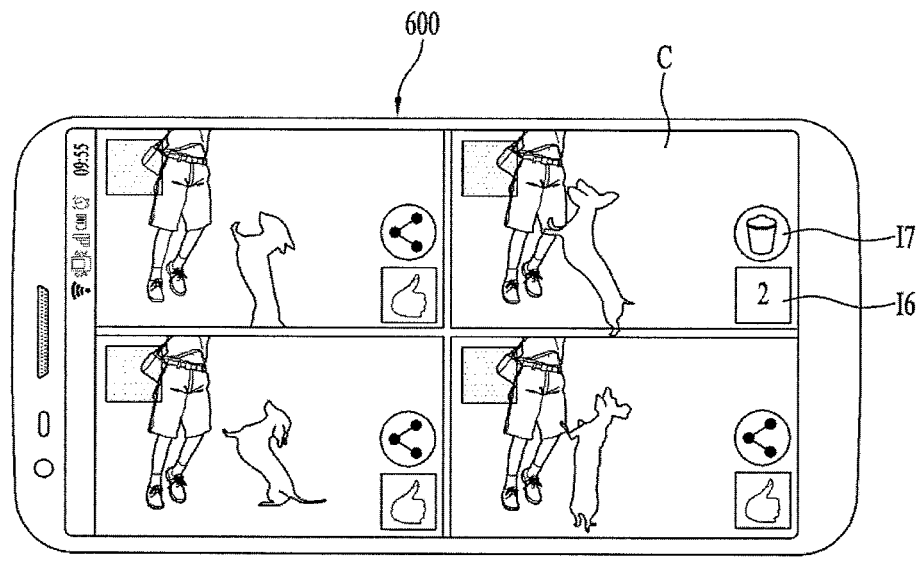
FIG. 12 is a diagram illustrating an example of a method for displaying a screen including a plurality of images belonging to a specific group when a plurality of identical images exist in a plurality of the images belonging to the specific group in a mobile terminal according to one embodiment of the present invention.

FIG. 12 is a diagram illustrating an example of a method for displaying a screen including a plurality of images belonging to a specific group when a plurality of identical images exist in a plurality of the images belonging to the specific group in a mobile terminal according to one embodiment of the present invention. In relation to FIG. 12, contents overlapped with what is mentioned earlier in FIG. 6 are not explained again. In the following, the difference between FIG. 6 and FIG. 12 is mainly explained.

In the present embodiment, when a plurality of identical images exist among a plurality of images belonging to a specific group, a screen displayed according to a first command, which is mentioned earlier in the step S530 of FIG. 5, is explained in more detail. Referring to FIG. 12, if images of which an identical object is positioned at an identical position exist among a plurality of the images, the controller 180 can control the display unit 151 to display a third image only on a partial region of the screen 600 among the images.

In this instance, the third image may correspond to an image of which visibility of a subject is highest among the images.

Specifically, the controller 180 can recognize at least one of an object included in each of a plurality of the images belonging to the specific group and a position of the object. The controller 180 can recognize whether there exist images of which the recognized object and the recognized position of the object are matched with each other among a plurality of the images belonging to the specific group. If there exist the images of which the recognized object (e.g., a size of the object, a shape of the object and the like) and the recognized position of the object are matched with each other among a plurality of the images, the controller 180 displays a third image C only on the screen 600 among the images and can control the display unit 151 not to display at least one or more images except the third image among the images.

When the third image C is displayed on the screen 600, the controller 180 can control the display unit 151 to display a sixth indicator 16 indicating the number of at least one or more images of which the object and the position of the object are matched with the third image and a seventh indicator 17 corresponding to a function of deleting at least one or more images of which the object and the position of the object are matched with the third image among a plurality of the images belonging to the specific group on the third image.

For instance, if there exist 2 images of which the object and the position of the object are matched with the third image among a plurality of the images belonging to the specific group, the controller 180 can control the display unit 151 to display the sixth indicator 16 on the third image C to indicate that there exist 2 images of which the object and the position of the object are matched with the third image. And, the controller 180 can control the display unit 151 to display the seventh indicator 17 corresponding to the function of deleting the 2 images of which the object and the position of the object are matched with the third image on the third image C.

A user can delete at least one or more images among images of which the object and the position of the object are matched from the memory 170 except the third image by selecting the seventh indicator 17 displayed on the third image C. Hence, when a plurality of identical images exist among a plurality of images included in the specific group, since a single image is displayed on the screen 600 only among a plurality of the identical images and the remaining images are not displayed, a user can conveniently see the screen 600. And, when a plurality of identical images exist in the memory 170, a user can easily delete a plurality of the identical images from the memory by leaving a single image only among a plurality of the identical images.

Meanwhile, according to an embodiment of the present invention, a user selects at least one or more images from a plurality of images included in the screen 600 and may be then able to share the at least one or more images at a time or delete the at least one or more images at a time. This will be described in more detail with reference to FIG. 13 in the following.

Figure 13:
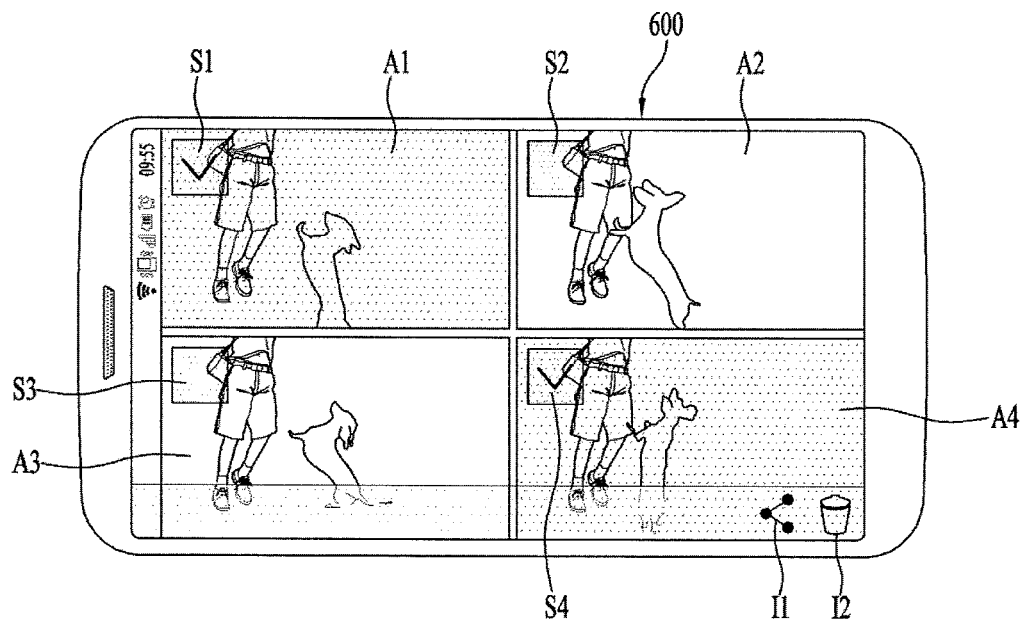
FIG. 13 is a diagram illustrating an example of a method for performing a function of deleting and a function of sharing by selecting at least one or more images from a screen including a plurality of images belonging to a specific group in a mobile terminal according to one embodiment of the present invention.

FIG. 13 is a diagram illustrating an example of a method for performing a function of deleting and a function of sharing by selecting at least one or more images from a screen including a plurality of images belonging to a specific group in a mobile terminal according to one embodiment of the present invention. In relation to FIG. 13, contents overlapped with what is mentioned earlier in FIG. 6 are not explained again. In the following, the difference between FIG. 6 and FIG. 13 is mainly explained.

In the present embodiment, a method for a user to delete at least one or more images among a plurality of images included in a screen at a time or a method for a user to share at least one or more images among a plurality of images included in a screen with an external server or an external device at a time using the screen including a plurality of the images belonging to a specific group according to a first command, which is mentioned earlier in FIG. 6, is explained in more detail.

Referring to FIG. 13, the controller 180 can control the display unit 151 to display a plurality of indicators S1/S2/S3/S4 corresponding to a function of selecting each of a plurality of images A1/A2/A3/A4 on a screen 600 including a plurality of the images A1/A2/A3/A4 belonging to a specific group.

If a command for selecting at least one or more indicators among a plurality of the indicators S1/S2/S3/S4 is detected, the controller 180 can select images corresponding to the at least one or more selected indicators. Subsequently, the controller 180 can control the display unit 151 to display at least one of a fifth indicator I1 corresponding to a function of sharing the at least one or more selected images with an external device or an external server and a sixth indicator 12 corresponding to a function of deleting the at least one or more selected images on a partial region of the screen 600. For instance, if a command for selecting a first indicator S1 and a fourth indicator S4 from a plurality of the indicators S1/S2/S3/S4 is detected, the controller 180 can recognize it as a first image A1 corresponding to the first indicator S1 and a fourth image A4 corresponding to the fourth indicator S4 are selected. Subsequently, the controller can control the display unit 151 to display at least one of a fifth indicator I1 corresponding to a function of sharing the selected first image A1 and the selected fourth image A4 with an external server or an external device and a sixth indicator 12 corresponding to a function of deleting the selected first image A1 and the selected fourth image A4 on a partial region of the screen 600.

Hence, according to the present embodiment, a user selects at least one or more images using a screen including a plurality of images belonging to the specific group and can share the at least one or more selected images with an external server or an external device at a time. Moreover, a user can delete the at least one or more selected images at a time, thereby enhancing convenience of a user.

Meanwhile, according to an embodiment of the present invention, not only a plurality of images stored in the memory 170 but also at least one or more videos stored in the memory 170 may belong to the specific group. This will be described in more detail with reference to FIG. 14 in the following.

FIG. 14 is a diagram illustrating an example of a method for displaying a screen including a plurality of images belonging to a specific group and at least one or more videos in a mobile terminal according to one embodiment of the present invention. In relation to FIG. 14, contents overlapped with what is mentioned earlier in FIG. 6 are not explained again. In the following, the difference between FIG. 6 and FIG. 14 is mainly explained.

According to the present embodiment, the controller 180 can control the camera 121 to capture not only at least one or more images but also at least one or more videos. The controller can control the wireless communication unit 110 to obtain location information corresponding to each of the at least one or more videos. The controller 180 can store at least one of the location information, a date on which each of the at least one or more videos is captured and time at which each of the at least one or more videos is captured in the memory 170 together with the at least one or more videos.

The controller 180 can categorize the at least one or more images and the at least one or more videos stored in the memory into at least one of groups based on at least one of the location information, the captured date and the captured time. Referring to FIG. 14 (a), the controller 180 can control the display unit 151 to display a screen 600 including the at least one or more images belonging to a specific group among the at least one of groups and thumbnail images of the at least one or more videos according to a first command.

For instance, if a first image A1, a second image A2, a third image A3 and a first video stored in the memory are matched with each other in terms of location information, captured time and a captured date, the controller 180 can categorize the first image A1, the second image A2, the third image A3 and the first video into a same group. Subsequently, the controller 180 can control the display unit 151 to display the screen 600 including the first image A1, the second image A2, the third image A3 and a thumbnail image V of the first video belonging to the same group according to the first command.

When the thumbnail image V of the first video is displayed on the screen 600, the controller 180 can control the display unit 151 to display at least one or more specific frames V1/V2/V3 included in the video on a partial region among a region on which the thumbnail image V is displayed. Specifically, the controller 180 can extract at least one or more frame images V1/V2/V3 corresponding to a predetermined condition from a plurality of frame images included in the video. Subsequently, the controller 180 can control the display unit 151 to display the at least one or more extracted frame images V1/V2/V3 on a partial region among a region on which the thumbnail image V is displayed. For instance, a frame image corresponding to the predetermined condition may correspond to a frame image of which a subject is clear, a frame image of which a focus on a subject is in focus and a frame image of which a subject does not close their eyes among a plurality of the frame images included in the video.

Referring to FIG. 14 (b), if a command for selecting a specific frame image V3 from at least one or more frame images V1/V2/V3 displayed on the thumbnail image V of the video is detected, the controller 180 can control the display unit to display a magnified image V3' of the selected specific frame image V3 on the screen 600 according to the command. Subsequently, the controller 180 can control the display unit to display at least one of a first indicator D1 corresponding to a function of storing the magnified image V3' in the memory 170 and a second indicator D2 corresponding to a function of sharing the magnified image V3' with an external server or an external device on the magnified image V3'.

According to the present embodiment, a user can check a frame image of which a subject is captured well among a plurality of frame images included in the video and the user can separately store the frame image of which the subject is captured well in the memory. Moreover, the user can share the frame image of which the subject is captured well with an external server or an external device. Meanwhile, according to one embodiment of the present invention, a user can change a layout of a screen including a plurality of images belonging to a specific group. This will be described in more detail with reference to FIG. 15 in the following.

Figure 15:
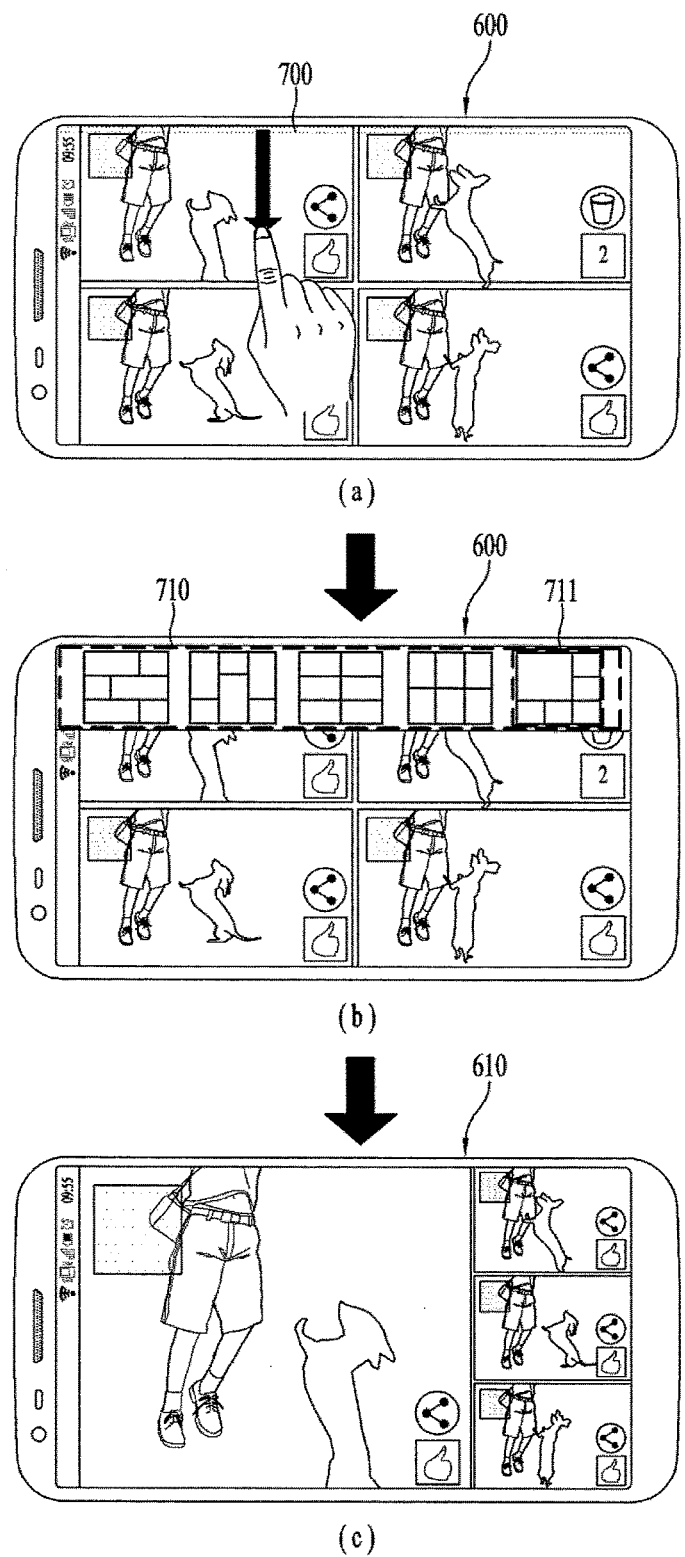
FIG. 15 is a diagram illustrating an example of a method for changing a layout of a screen including a plurality of images belonging to a specific group in a mobile terminal according to one embodiment of the present invention.

FIG. 15 is a diagram illustrating an example of a method for changing a layout of a screen including a plurality of images belonging to a specific group in a mobile terminal according to one embodiment of the present invention. In relation to FIG. 15, contents overlapped with what is mentioned earlier in FIG. 6 are not explained again. In the following, the difference between FIG. 6 and FIG. 15 is mainly explained.

In the present embodiment, a method for a user to change a layout of a screen including a plurality of images belonging to a specific group according to a first command, which is mentioned earlier in FIG. 6, is explained in more detail. Referring to FIG. 15 (a), when the screen 600 is displayed, the controller 180 can detect a first touch command touching a random point of a top part 700 of the screen 600 and dragging the touch in down direction.

Referring to FIG. 15 (b), the controller 180 can control the display unit 151 to display a window related to change of a layout of the screen 600 on a specific region 710 of the screen 600 according to the first touch command. Specifically, the memory 170 may store information on at least one or more layouts in advance. The controller 180 can control the display unit 151 to display the window related to the change of the layout on the specific region 710 of the screen 600 using the information on the layouts stored in the memory 170.

Referring to FIG. 15 (c), if a second touch command for selecting a region 711 corresponding to a specific layout among the layouts displayed on the specific region 710 in FIG. 15 (b) is detected, the controller 180 can control the display unit 151 to display a screen 610 to which a layout related to the region 711 corresponding to the specific layout is applied according to the second touch command.

According to an embodiment, when the screen 600 or the screen 610 to which the layout is applied is displayed, if a touch command for touching a region corresponding to a boundary line of each of a plurality of images included in the screen 600 for prescribed time and dragging the touch in a specific direction is detected, the controller 180 can change a layout of the screen 600 or a layout of the screen 610 to which the layout is applied according to the touch command. According to the present embodiment, since a user can freely change a layout of a screen including a plurality of images belonging to a specific group, it can provide friendliness to the user.

Figure 16:
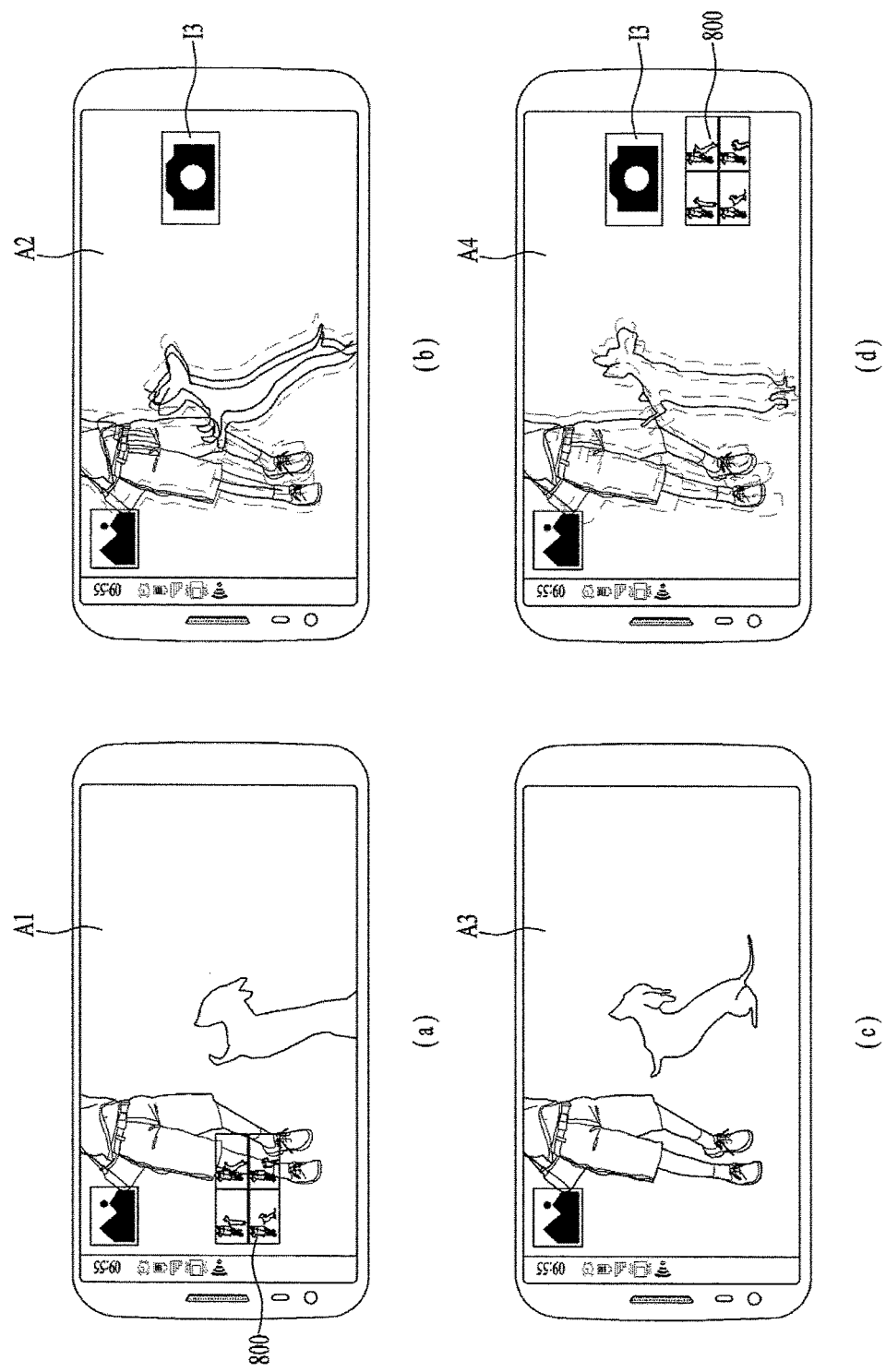
FIG. 16 is a diagram illustrating an example of a method for outputting an image among a plurality of images belonging to a specific group in a mobile terminal according to one embodiment of the present invention.

FIG. 16 is a diagram illustrating an example of a method for outputting an image among a plurality of images belonging to a specific group in a mobile terminal according to one embodiment of the present invention. In relation to the present embodiment, for clarity, assume that a plurality of images included in a specific group include a first image A1, a second image A2, a third image A3 and a fourth image A4. In this instance, the first image A1 corresponds to a lastly captured image among a plurality of the images, the fourth image A4 corresponds to a firstly captured image among a plurality of the images, the third image A3 corresponds to an image captured after the fourth image A4 is captured, and the second image A2 corresponds to an image captured after the third image A3 is captured.

Referring to FIG. 16 (a), if a first command for displaying the first image A1 among a plurality of the images A1/A2/A3/A4 included in the specific group is detected, the controller 180 can control the display unit 151 to display the first image A1 according to the first command. For instance, the first command may correspond to a command for selecting the first image A1 in a gallery application, a command for selecting a thumbnail image corresponding to the first image A1 from a screen outputting a preview image captured by the camera or a touch command for touching a point and dragging the touch in a specific direction when an image different from the first image A1 is displayed.

The controller 180 can control the display unit to display a first indicator 800 including thumbnail images corresponding to each of a plurality of the images A1/A2/A3/A4 on a partial region of the first image A1.

The partial region on which the first indicator 800 is displayed may correspond to a partial region positioned at the left of the first image A1. Hence, a user recognizes a position on which the first indicator 800 is displayed, touches a random point of the first image A1 and can intuitively know that a screen including a plurality of the images A1/A2/A3/A4 belonging to the specific group, which is mentioned earlier in FIGS. 6 to 15, is displayed according to a touch command for dragging the touch in a direction opposite to a direction at which the first indicator is positioned. This will be described later in more detail with reference to FIG. 17.

Meanwhile, referring to FIG. 16 (b), if a second command for displaying a second image A2 among a plurality of the images A1/A2/A3/A4 included in the specific group is detected, the controller 180 can control the display unit 151 to display the second image A2 according to the second command. For instance, the second command may correspond to a command for selecting the second image A2 in a gallery application or a touch command for touching a point of the first image A1 and dragging the touch in the left direction when the first image A1 of FIG. 16 (a) is displayed.

According to an embodiment, the controller 180 can recognize whether the second image A2 satisfies a predetermined condition. If it is determined as the second image A2 does not satisfy the predetermined condition, the controller 180 can control the display unit 151 to display a second indicator 13 corresponding to a function of recapturing on a partial region of the second image A2. For instance, an image satisfying the predetermined condition may correspond to an image of which a subject is clear, an image of which a focus on a subject is in focus or an image of which a subject does not close their eyes.

The controller 180 activates the camera 121 according to a command for selecting the second indicator 13 and can control the display unit 151 to display a preview image captured by the camera. The controller 180 deletes the second image A2 from the memory 170 according to a capture command when the preview image is displayed, captures the displayed preview image and can store the captured preview image in the memory 170. Subsequently, the controller 180 can categorize the preview image stored in the memory into the specific group.

Meanwhile, referring to FIG. 16 (c), if a third command for displaying a third image A3 among a plurality of the images A1/A2/A3/A4 included in the specific group is detected, the controller 180 can control the display unit 151 to display the third image A3 according to the third command. For instance, the third command may correspond to a command for selecting the third image A3 in a gallery application or a touch command for touching a point of the second image A2 and dragging the touch in the left direction when the second image A2 of FIG. 16 (b) is displayed.

According to an embodiment, the controller 180 can recognize whether the third image A3 satisfies a predetermined condition. If it is determined as the third image A3 does not satisfy the predetermined condition, as shown in FIG. 16 (b), the controller 180 can control the display unit 151 to display a second indicator 13 corresponding to a function of recapturing on a partial region of the third image A3. In this instance, unlike FIG. 16 (b), it is determined as the third image A3 satisfies the predetermined condition in FIG. 16 (c), the controller 180 can not display the second indicator 13 on the third image A3.

Referring to FIG. 16 (d), if a fourth command for displaying a fourth image A4 among a plurality of the images A1/A2/A3/A4 included in the specific group is detected, the controller 180 can control the display unit 151 to display the fourth image A4 according to the fourth command. For instance, the fourth command may correspond to a command for selecting the fourth image A4 in a gallery application or a touch command for touching a point of the third image A3 and dragging the touch in the left direction when the third image A3 of FIG. 16 (c) is displayed.

The controller 180 can control the display unit 151 to display a first indicator 800 including thumbnail images corresponding to each of a plurality of the images A1/A2/A3/A4 on a partial region of the first image A1. The partial region on which the first indicator 800 is displayed may correspond to a partial region positioned at the right of the fourth image A4. Hence, a user recognizes a position on which the first indicator 800 is displayed, touches a random point of the first image A1 and can intuitively know that a screen including a plurality of the images A1/A2/A3/A4 belonging to the specific group, which is mentioned earlier in FIGS. 6 to 15, is displayed according to a touch command for dragging the touch in a direction opposite to a direction at which the first indicator 800 is positioned. This will be described later in more detail with reference to FIG. 17.

Meanwhile, according to an embodiment, the controller 180 can recognize whether the fourth image A4 satisfies a predetermined condition. If it is determined as the fourth image A4 does not satisfy the predetermined condition, the controller 180 can control the display unit 151 to display a second indicator 13 corresponding to a function of recapturing on a partial region of the fourth image A4. For instance, an image satisfying the predetermined condition may correspond to an image of which a subject is clear, an image of which a focus on a subject is in focus or an image of which a subject does not close their eyes.

The controller 180 activates the camera 121 according to a command for selecting the second indicator 13 and can control the display unit 151 to display a preview image captured by the camera. The controller 180 deletes the fourth image A4 from the memory 170 according to a capture command when the preview image is displayed and can store the displayed preview image in the memory 170. Subsequently, the controller 180 can categorize the preview image stored in the memory 170 into the specific group.

Consequently, when the lastly captured first image A1 or the firstly captured fourth image A4 among a plurality of the images belonging to the specific group is displayed, the controller 180 can control the display unit 151 to display a first indicator 800 including thumbnail images corresponding to each of a plurality of the images belonging to the specific group on a partial region of the first image A1 or the fourth image A4. Subsequently, if it is determined as an image not satisfying the predetermined condition among a plurality of the images belonging to the specific group is displayed, the controller 180 can control the display unit 151 to display a second indicator 13 corresponding to a function of recapturing on the displayed image.

Figure 17:
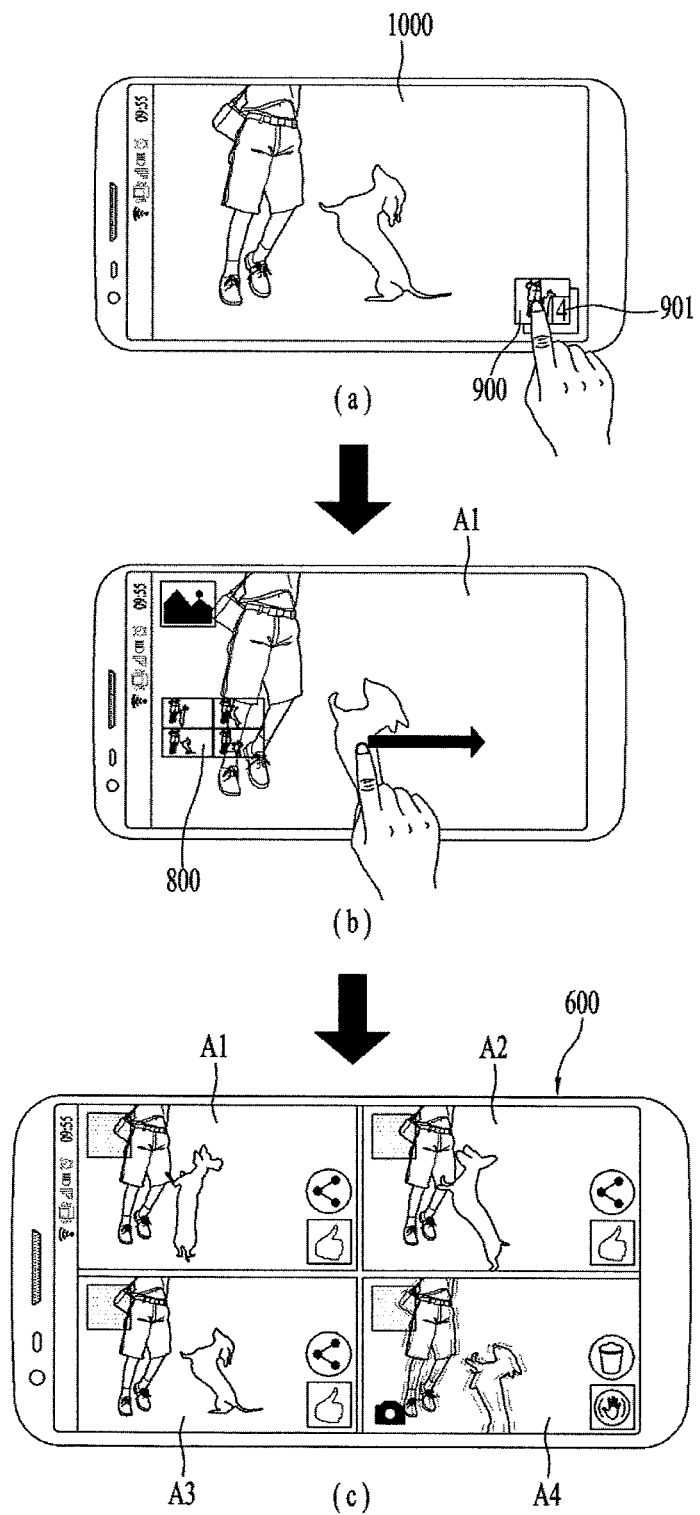
FIG. 17 is a diagram illustrating an example of a method for displaying a screen including a plurality of images belonging to a specific group in a mobile terminal according to one embodiment of the present invention.

In the following, an example for a method of displaying a screen including a plurality of images belonging to the specific group is explained with reference to FIG. 17 and FIG. 18. FIG. 17 is a diagram illustrating an example of a method for displaying a screen including a plurality of images belonging to a specific group in a mobile terminal according to one embodiment of the present invention. In relation to FIG. 17, contents overlapped with what is mentioned earlier in FIGS. 6 to 16 are not explained again. In the following, a different point is mainly concerned.

In relation to the present embodiment, for clarity, assume that a plurality of images included in a specific group include a first image A1, a second image A2, a third image A3 and a fourth image A4. In this instance, the first image A1 corresponds to a lastly captured image among a plurality of the images, the fourth image A4 corresponds to a firstly captured image among a plurality of the images, the third image A3 corresponds to an image captured after the fourth image A4 is captured, and the second image A2 corresponds to an image captured after the third image A3 is captured.

Referring to FIG. 17 (a), when a preview image 1000 capture by a camera 121 is displayed, the controller 180 can determine whether an image captured immediately before the preview image 100 is displayed corresponds to an image belonging to a specific group. Specifically, the controller 180 can determine whether the image captured before the preview image 1000 is displayed corresponds to the image belonging to the specific group using capture time of each of a plurality of images stored in the memory 170.

If it is determined as the image captured before the preview image 1000 is displayed corresponds to the image belonging to the specific group, the controller 180 can control the display unit 151 to display a thumbnail image 900 corresponding to a lastly captured image A1 among images belonging to the specific group on a partial region of the preview image 1000. Subsequently, the controller 180 can control the display unit 151 to display a first indicator indicating the number of images belonging to the specific group on the thumbnail image 900. On the contrary, if it is determined as the image captured before the preview image 1000 is displayed does not correspond to the image belonging to the specific group, the controller 180 can control the display unit 151 to display a thumbnail image corresponding to the image captured before the preview image is displayed only on a partial region of the preview image 1000.

Referring to FIG. 17 (b), the controller 180 can control the display unit to display a lastly captured image A1 among images belonging to the specific group according to a command for selecting the thumbnail image 900 of FIG. 17 (a). The controller 180 can control the display unit to display a first indicator 800 including thumbnail images corresponding to each of a plurality of the images A1/A2/A3/A4 on a partial region of the first image A1.

The partial region on which the first indicator 800 is displayed may correspond to a partial region positioned at the left of the first image A1. Hence, a user recognizes a position on which the first indicator 800 is displayed, touches a random point of the first image A1 and can intuitively know that a screen including a plurality of the images A1/A2/A3/A4 belonging to the specific group, which is mentioned earlier in FIGS. 6 to 15, is displayed according to a touch command for dragging the touch in a direction opposite to a direction at which the first indicator 800 is positioned.

For instance, referring to FIG. 17 (c), when the first image A1 is displayed as shown in FIG. 17 (b), the controller 180 can display a screen 600 including a plurality of the images A1/A2/A3/A4 belonging to the specific group according to a touch command for dragging a touch to the right direction, which is an opposite direction of the left direction at which the first indicator 800 is positioned. In this instance, since the screen 600 including a plurality of the images A1/A2/A3/A4 belonging to the specific group is identical to what is mentioned earlier in FIG. 6, detail explanation is omitted at this time.

Meanwhile, according to an embodiment, the controller 180 can control the display unit 151 to display a first indicator 800 including thumbnail images corresponding to each of a plurality of the images A1/A2/A3/A4 on a partial region of the fourth image A4. In this instance, the first indicator 800 corresponds to an indicator corresponding to a function of displaying a screen including a plurality of the images A1/A2/A3/A4 belonging to the specific group mentioned earlier in FIGS. 6 to 15. The partial region on which the first indicator 800 is displayed may correspond to a partial region positioned at the right of the fourth image A4. The controller 180 can control the display unit to display a screen 600 including a plurality of the images A1/A2/A3/A4 belonging to the specific group according to a touch command for dragging a touch in the left direction, which is an opposite direction of the left direction at which the first indicator 800 is positioned.

Figure 18:
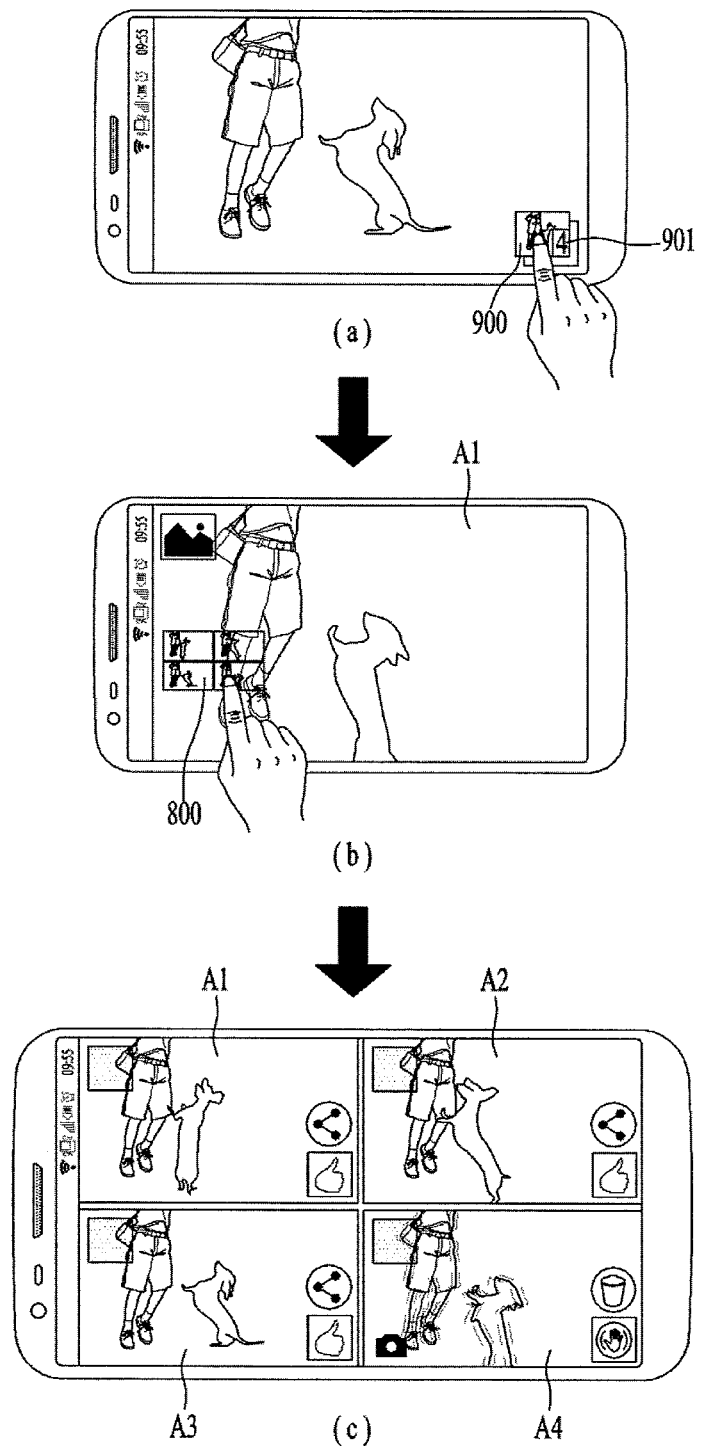
FIG. 18 is a diagram illustrating a different example of a method for displaying a screen including a plurality of images belonging to a specific group in a mobile terminal according to one embodiment of the present invention.

FIG. 18 is a diagram illustrating a different example of a method for displaying a screen including a plurality of images belonging to a specific group in a mobile terminal according to one embodiment of the present invention. In relation to FIG. 18, contents overlapped with what is mentioned earlier in FIGS. 6 to 16 are not explained again. In the following, a different point is mainly concerned. In relation to the present embodiment, for clarity, assume that a plurality of images included in a specific group include a first image A1, a second image A2, a third image A3 and a fourth image A4. In this instance, the first image A1 corresponds to a lastly captured image among a plurality of the images, the fourth image A4 corresponds to a firstly captured image among a plurality of the images, the third image A3 corresponds to an image captured after the fourth image A4 is captured, and the second image A2 corresponds to an image captured after the third image A3 is captured.

Referring to FIG. 18 (a), when a preview image 1000 capture by a camera 121 is displayed, the controller 180 can determine whether an image captured immediately before the preview image 100 is displayed corresponds to an image belonging to a specific group. Specifically, the controller 180 can determine whether the image captured before the preview image 1000 is displayed corresponds to the image belonging to the specific group using capture time of each of a plurality of images stored in the memory 170.

If it is determined as the image captured before the preview image 1000 is displayed corresponds to the image belonging to the specific group, the controller 180 can control the display unit 151 to display a thumbnail image 900 corresponding to a lastly captured image A1 among images belonging to the specific group on a partial region of the preview image 1000. Subsequently, the controller 180 can control the display unit 151 to display a first indicator indicating the number of images belonging to the specific group on the thumbnail image 900. On the contrary, if it is determined as the image captured before the preview image 1000 is displayed does not correspond to the image belonging to the specific group, the controller 180 can control the display unit 151 to display a thumbnail image corresponding to the image captured before the preview image is displayed only on a partial region of the preview image 1000.

Referring to FIG. 18 (b), the controller 180 can control the display unit to display a lastly captured image A1 among images belonging to the specific group according to a command for selecting the thumbnail image 900 of FIG. 18 (a). The controller 180 can control the display unit to display a first indicator 800 including thumbnail images corresponding to each of a plurality of the images A1/A2/A3/A4 on a partial region of the first image A1.

Referring to FIG. 18 (c), if a command for selecting the first indicator 800 is detected in FIG. 18 (b), the controller 180 can control the display unit 151 to display a screen 600 including a plurality of the images A1/A2/A3/A4 belonging to the specific group. In particular, a user can make the screen 600 including a plurality of the images belonging to the specific group to be displayed by selecting the first indicator 800.

Meanwhile, according to an embodiment, the controller 180 can control the display unit 151 to display a first indicator 800 including thumbnail images corresponding to each of a plurality of the images A1/A2/A3/A4 on a partial region of the fourth image A4. In this instance, the first indicator 800 corresponds to an indicator corresponding to a function of displaying a screen including a plurality of the images A1/A2/A3/A4 belonging to the specific group mentioned earlier in FIGS. 6 to 15. If a command for selecting the first indicator 800 is detected, the controller 180 can control the display unit to display a screen 600 including a plurality of the images A1/A2/A3/A4 belonging to the specific group. In particular, a user can make the screen 600 including a plurality of the images belonging to the specific group to be displayed by selecting the first indicator 800.

Meanwhile, according to an embodiment of the present invention, if a plurality of images stored in the memory 170 are categorized into at least one of groups, a prescribed visual effect can be provided to thumbnail images corresponding to each of a plurality of the images belonging to the at least one of groups in a gallery application. This will be described in more detail with reference to FIG. 19 in the following.

Figure 19:
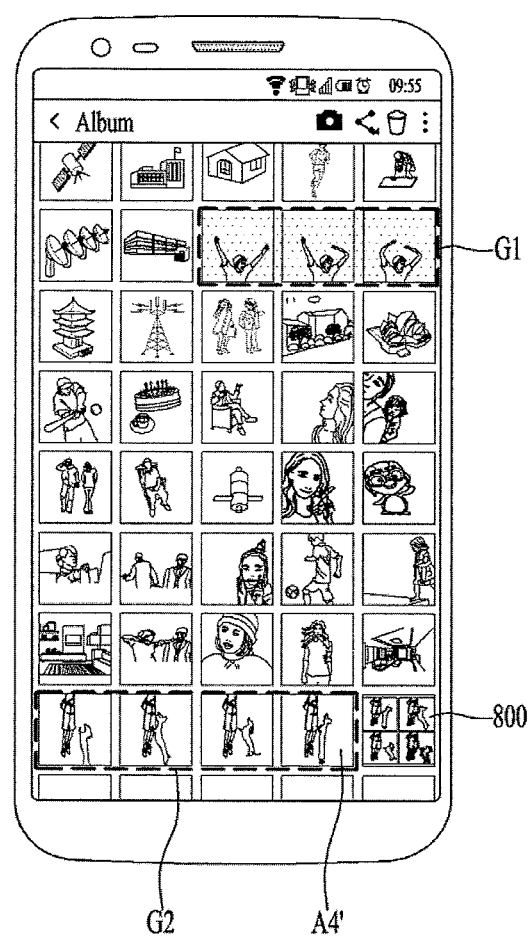
FIG. 19 is a diagram illustrating an example of a method for displaying a thumbnail image corresponding to each of a plurality of images categorized into at least one of groups in a gallery application of a mobile terminal according to one embodiment of the present invention.

FIG. 19 is a diagram illustrating an example of a method for displaying a thumbnail image corresponding to each of a plurality of images categorized into at least one of groups in a gallery application of a mobile terminal according to one embodiment of the present invention.

According to the present embodiment, the controller 180 can control the camera 121 to capture a plurality of images according to an image capture command. The controller 180 can control the wireless communication unit 110 to obtain location information corresponding to each of a plurality of the images. Specifically, the controller 180 can control a location information module to obtain the location information corresponding to each of a plurality of the images. And, the controller 180 can store information on a location at which each of a plurality of the images is captured, a date on which each of a plurality of the images is captured and time at which each of a plurality of the images is captured in the memory 170 together with a plurality of the images.

The controller 180 can categorize a plurality of the images stored in the memory 170 into at least one of groups based on at least one of the location information, the captured date and the captured time. In this instance, at least one of the location information, the captured date and the captured time is matched with each other in case of a plurality of images belonging to a same group among the at least one of groups.

Referring to FIG. 19, the controller 180 can control the display unit 151 to display an execution screen of a specific application according to an execution command of the specific application (e.g., a gallery application). The controller 180 can control the display unit 151 to display thumbnail images corresponding to each of a plurality of the images stored in the memory 170 on the execution screen.

When the thumbnail images corresponding to each of a plurality of the images are displayed on the execution screen, the controller 180 can categorize a plurality of the images into at least one of groups (G1, G2) using at least one of the location information, the captured date and the captured time. And, the controller 180 can provide an identical visual effect to thumbnail images corresponding to each of a plurality of the images belonging to a same group. For instance, the controller 180 can provide an identical highlight effect to thumbnail images corresponding to each of a plurality of images belonging to a first group G1 among the at least one of groups (G1, G2). And, the controller can provide a highlight effect different from the aforementioned highlight effect to thumbnail images corresponding to each of a plurality of images belonging to a second group G2 different from the first group G1.

Hence, a user can easily recognize a plurality of images belonging to a same group among images stored in the memory 170 via the aforementioned visual effect. The controller 180 can control the display unit 151 to display a first indicator including thumbnail images corresponding to each of a plurality of images belonging to the second group G2 in the vicinity of the second group G2 to which a lastly captured first image belongs among the at least one of groups (G1, G2). For instance, the controller 180 can control the display unit to display the first indicator 800 on the right of a thumbnail image A4' corresponding to the lastly captured image among a plurality of the images belonging to the second group G2.

Figure 20:
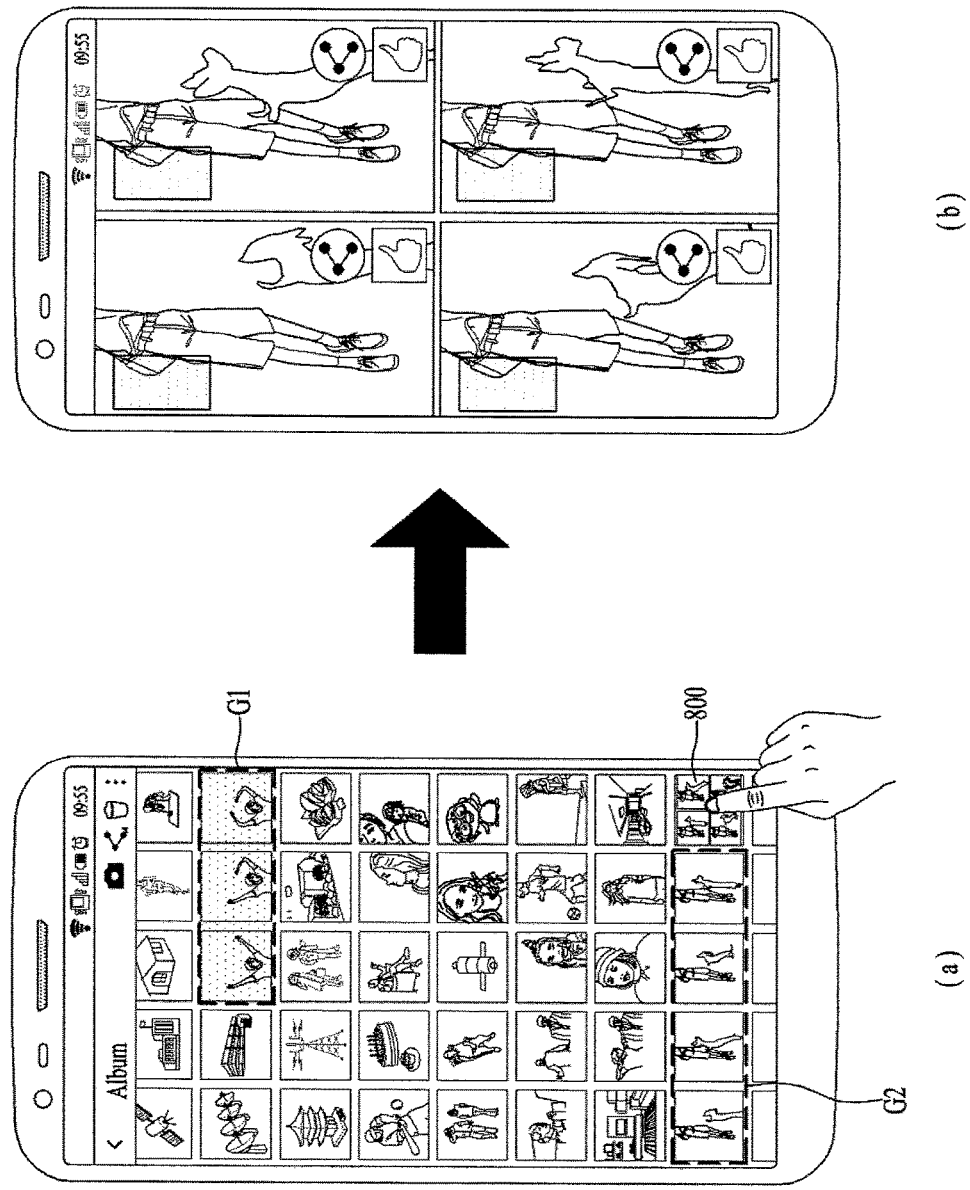
FIG. 20 is a diagram illustrating a further different example of a method for displaying a screen including a plurality of images belonging to a specific group in a mobile terminal according to one embodiment of the present invention.

In the following, an example for a method of displaying a screen including a plurality of images belonging to the specific group is explained with reference to FIGS. 20 to 23. FIG. 20 is a diagram illustrating a further different example of a method for displaying a screen including a plurality of images belonging to a specific group in a mobile terminal according to one embodiment of the present invention. In relation to FIG. 20, contents, which are overlapped with what is mentioned earlier in FIG. 6 to FIG. 15 and FIG. 19, are not explained again. In the following, a different point is mainly concerned.

Referring to FIG. 20 (*a*), the controller 180 can control the display unit 151 to display an execution screen of a specific application according to an execution command of the specific application (e.g., a gallery application). The controller 180 can control the display unit 151 to display thumbnail images corresponding to each of a plurality of the images stored in the memory 170 on the execution screen.

When the thumbnail images corresponding to each of a plurality of the images are displayed on the execution screen, the controller 180 can categorize a plurality of the images into at least one of groups (G1, G2) using at least one of location information, a captured date and captured time of a plurality of the images. And, the controller 180 can provide a prescribed visual effect to thumbnail images corresponding to each of a plurality of images belonging to a same group. For instance, the controller 180 can provide an identical highlight effect to thumbnail images corresponding to each of a plurality of images belonging to a same group among the at least one of groups (G1, G2).

The controller 180 can control the display unit 151 to display a first indicator 800 including thumbnail images corresponding to each of a plurality of images belonging to the second group G2 in the vicinity of the second group G2 to which a lastly captured first image belongs among the at least one of groups (G1, G2). For instance, the controller 180 can control the display unit to display the first indicator 800 on the right of a thumbnail image A4' corresponding to the lastly captured image among a plurality of the images belonging to the second group G2.

Referring to FIG. 20 (*b*), the controller 180 can control the display unit 151 to display a screen including a plurality of images A1/A2/A3/A4 belonging to the second group G2 according to a command for selecting the first indicator 800 in FIG. 20 (*a*). Since explanation on the screen is identical to what is mentioned earlier in FIGS. 6 to 15, detail explanation is omitted at this time.

According to the present embodiment, a user can make a screen including a plurality of images belonging to a specific group to be displayed according to a command for selecting an indicator displayed on an execution screen of the gallery application, thereby enhancing convenience of the user.

Figure 21:
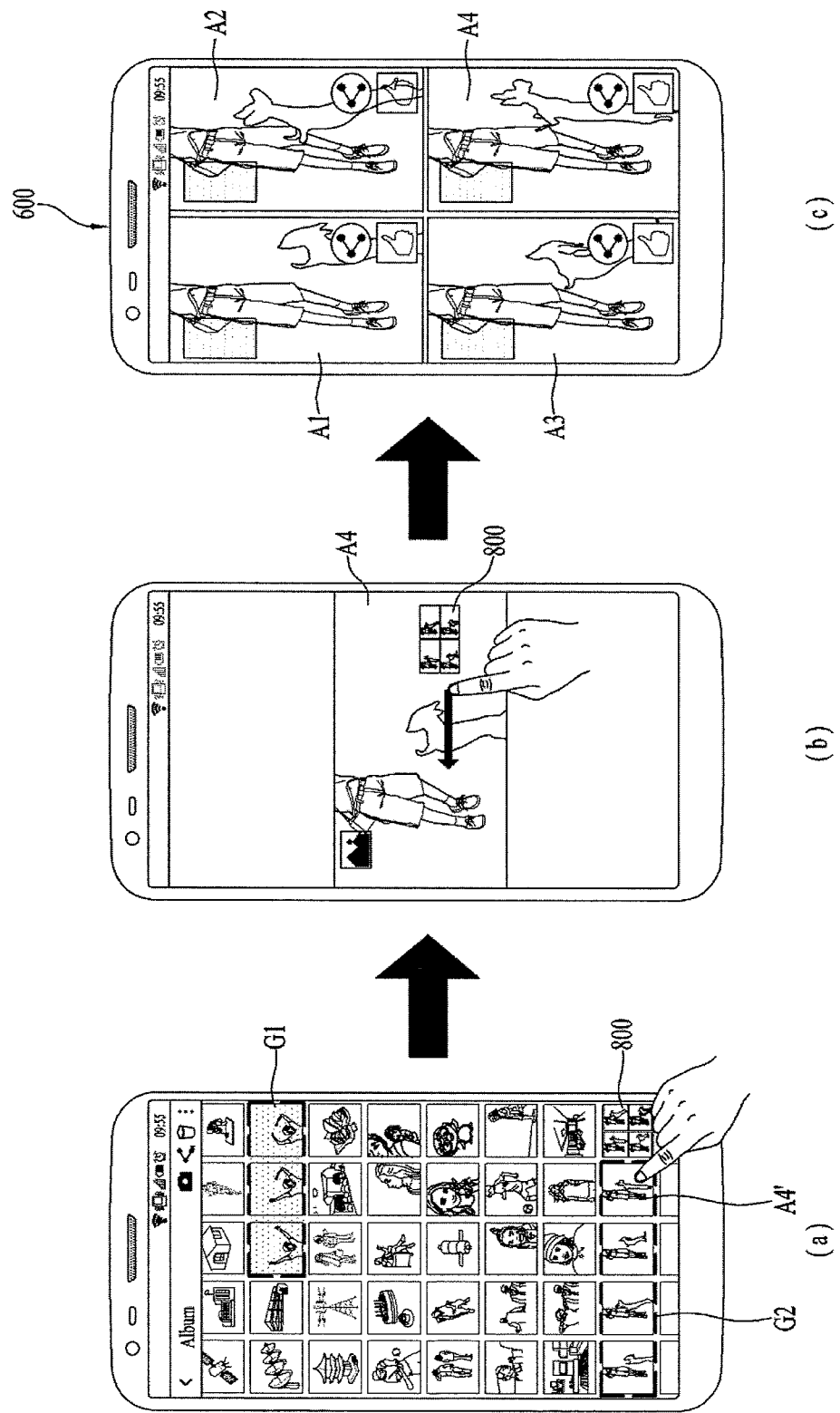
FIG. 21 is a diagram illustrating a further different example of a method for displaying a screen including a plurality of images belonging to a specific group in a mobile terminal according to one embodiment of the present invention.

FIG. 21 is a diagram illustrating a further different example of a method for displaying a screen including a plurality of images belonging to a specific group in a mobile terminal according to one embodiment of the present invention. In relation to FIG. 21, contents, which are overlapped with what is mentioned earlier in FIG. 6 to FIG. 15 and FIG. 19, are not explained again. In the following, a different point is mainly concerned.

Referring to FIG. 21 (*a*), the controller 180 can control the display unit 151 to display an execution screen of a specific application according to an execution command of the specific application (e.g., a gallery application). The controller 180 can control the display unit 151 to display thumbnail images corresponding to each of a plurality of the images stored in the memory 170 on the execution screen.

When the thumbnail images corresponding to each of a plurality of the images are displayed on the execution screen, the controller 180 can categorize a plurality of the images into at least one of groups (G1, G2) using at least one of location information, a captured date and captured time of a plurality of the images. And, the controller 180 can provide a prescribed visual effect to thumbnail images corresponding to each of a plurality of images belonging to a same group. For instance, the controller 180 can provide an identical highlight effect to thumbnail images corresponding to each of a plurality of images belonging to a same group among the at least one of groups (G1, G2).

The controller 180 can control the display unit 151 to display a first indicator 800 including thumbnail images corresponding to each of a plurality of images belonging to the second group G2 in the vicinity of the second group G2 to which a lastly captured first image belongs among the at least one of groups (G1, G2). For instance, the controller 180 can control the display unit to display the first indicator 800 on the right of a thumbnail image A4' corresponding to the lastly captured image among a plurality of the images belonging to the second group G2.

Referring to FIG. 21(*b*), if a touch command for selecting a thumbnail image A4' corresponding to a firstly captured image from a plurality of images belonging to the second group G2 is detected in FIG. 21(*a*), the controller 180 can control the display unit 151 to display a fourth image A4 corresponding to the thumbnail image A4' according to the touch command.

Since the fourth image A4 corresponds to the firstly captured image among a plurality of the images belonging to the second group G2, the controller 180 can control the display unit 151 to display a first indicator 800 including thumbnail images corresponding to each of a plurality of the images belonging to the second group G2 on a partial region of the fourth image A4. For instance, the partial region on which the first indicator 800 is displayed may correspond to a partial region positioned at the right of the fourth image A4.

Referring to FIG. 21(c), if a touch command for touching a random point of the fourth image A4 of FIG. 21(b) and dragging the touch in a direction opposite to a direction at which the first indicator 800 is positioned is detected, the controller 180 can control the display unit 151 to display a screen 600 including a plurality of images A1/A2/A3/A4 belonging to the second group according to the touch command. Since the screen 600 is identical to what is mentioned earlier in FIGS. 6 to 15, detail explanation is omitted at this time.

Meanwhile, according to an embodiment, if a touch command for selecting a thumbnail image corresponding to a lastly captured image from a plurality of images belonging to the second group G2 is detected in FIG. 21 (a), the controller 180 can control the display unit 151 to display an image corresponding to the selected thumbnail image according to the touch command. In this instance, since the displayed image corresponds to the lastly captured image among a plurality of the images belonging to the second group G2, the controller 180 can control the display unit 151 to display a first indicator 800 including thumbnail images corresponding to each of a plurality of the images belonging to the second group G2 on a partial region of the displayed image. For instance, the partial region on which the first indicator 800 is displayed may correspond to a partial region positioned at the left of the displayed image. And, if a touch command for touching a random point of the displayed image and dragging the touch in a direction opposite to a direction at which the first indicator 800 is positioned is detected, the controller 180 can control the display unit 151 to display a screen 600 including a plurality of images A1/A2/A3/A4 belonging to the second group according to the touch command.

Figure 22:
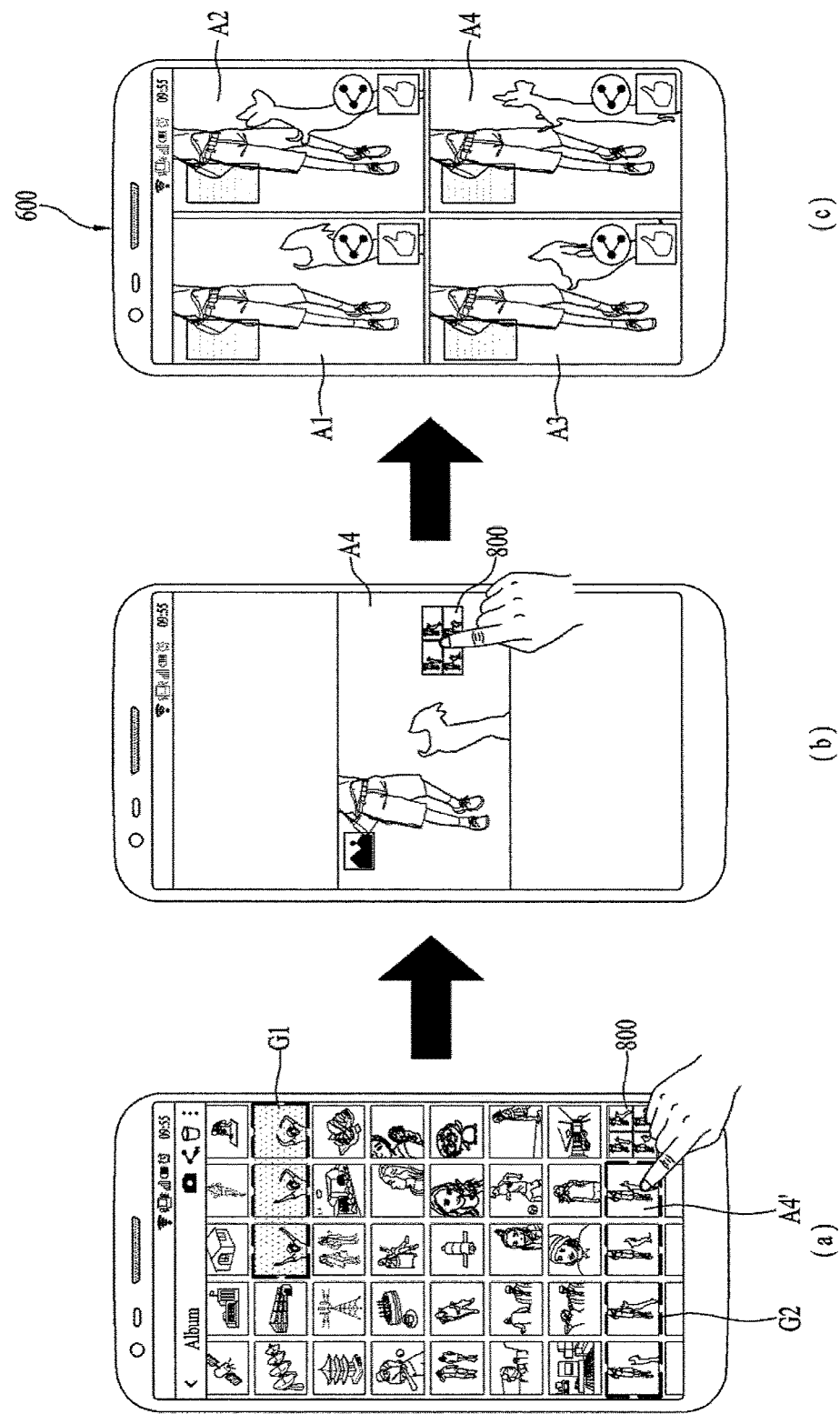
FIG. 22 is a diagram illustrating a further different example of a method for displaying a screen including a plurality of images belonging to a specific group in a mobile terminal according to one embodiment of the present invention.

FIG. 22 is a diagram illustrating a further different example of a method for displaying a screen including a plurality of images belonging to a specific group in a mobile terminal according to one embodiment of the present invention. In relation to FIG. 22, contents overlapped with what is mentioned earlier in FIGS. 6 to 15, and 19 are not explained again. In the following, a different point is mainly concerned.

Referring to FIG. 22 (a), the controller 180 can control the display unit 151 to display an execution screen of a specific application according to an execution command of the specific application (e.g., a gallery application). The controller 180 can control the display unit 151 to display thumbnail images corresponding to each of a plurality of the images stored in the memory 170 on the execution screen.

When the thumbnail images corresponding to each of a plurality of the images are displayed on the execution screen, the controller 180 can categorize a plurality of the images into at least one of groups (G1, G2) using at least one of location information, a captured date and captured time of a plurality of the images. And, the controller 180 can provide a prescribed visual effect to thumbnail images corresponding to each of images belonging to a same group. For instance, the controller 180 can provide an identical highlight effect to the thumbnail images corresponding to each of a plurality of the images belonging to the same group.

The controller 180 can control the display unit 151 to display a first indicator 800 including thumbnail images corresponding to each of a plurality of images belonging to the second group G2 in the vicinity of the second group G2 to which a lastly captured first image belongs among the at least one of groups (G1, G2). For instance, the controller 180 can control the display unit to display the first indicator 800 on the right of a thumbnail image A4' corresponding to the lastly captured image among a plurality of the images belonging to the second group G2.

Referring to FIG. 22 (b), if a touch command for selecting a thumbnail image A4' corresponding to a firstly captured image from a plurality of images belonging to the second group G2 is detected in FIG. 22 (a), the controller 180 can control the display unit 151 to display a fourth image A4 corresponding to the thumbnail image A4' according to the touch command.

Since the fourth image A4 corresponds to the firstly captured image among a plurality of the images belonging to the second group G2, the controller 180 can control the display unit 151 to display a first indicator 800 including thumbnail images corresponding to each of a plurality of the images belonging to the second group G2 on a partial region of the fourth image A4. For instance, the partial region on which the first indicator 800 is displayed may correspond to a partial region positioned at the right of the fourth image A4.

Referring to FIG. 22 (c), if a command for touching the indicator 800 of FIG. 21(b) is detected, the controller 180 can control the display unit 151 to display a screen 600 including a plurality of images A1/A2/A3/A4 belonging to the second group according to the command. Since the screen 600 is identical to what is mentioned earlier in FIGS. 6 to 15, detail explanation is omitted at this time.

Meanwhile, according to an embodiment, if a touch command for selecting a thumbnail image corresponding to a lastly captured image from a plurality of images belonging to the second group G2 is detected in FIG. 22 (a), the controller 180 can control the display unit 151 to display an image corresponding to the selected thumbnail image according to the touch command. In this instance, since the displayed image corresponds to the lastly captured image among a plurality of the images belonging to the second group G2, the controller 180 can control the display unit 151 to display a first indicator 800 including thumbnail images corresponding to each of a plurality of the images belonging to the second group G2 on a partial region of the displayed image. For instance, the partial region on which the first indicator 800 is displayed may correspond to a partial region positioned at the left of the displayed image. And, if a command for selecting the first indicator 800 is detected, as shown in FIG. 22 (c), the controller 180 can control the display unit 151 to display a screen 600 including a plurality of images A1/A2/A3/A4 belonging to the second group according to the command.

Figure 23:
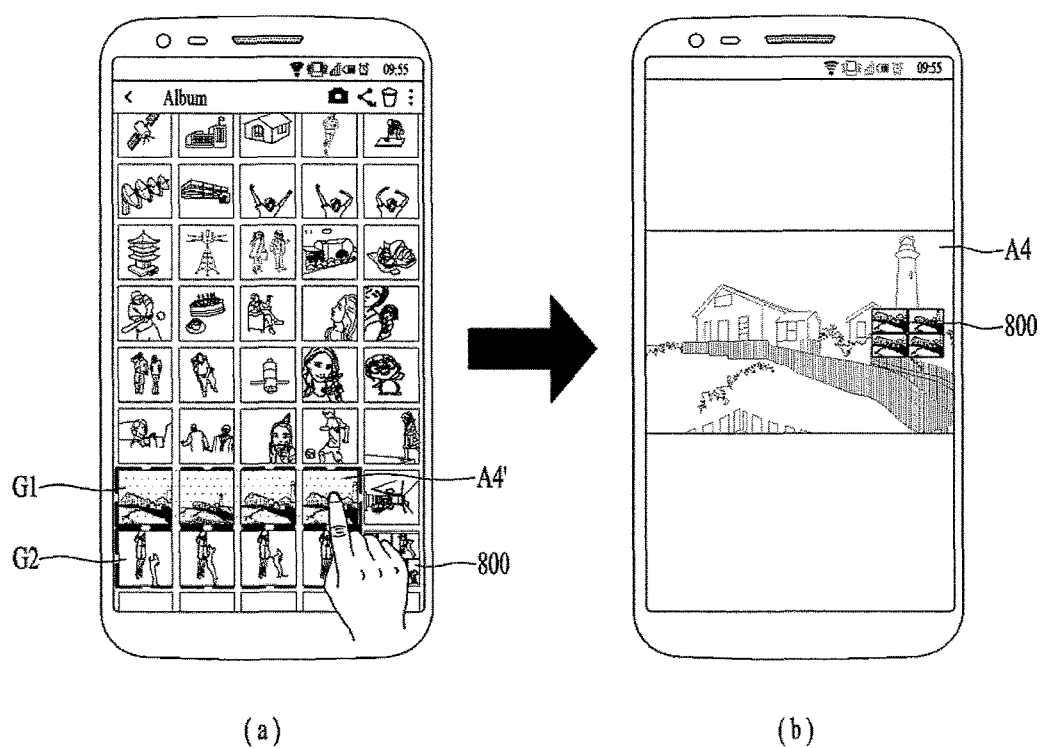
FIG. 23 is a diagram illustrating a further different example of a method for displaying a screen including a plurality of images belonging to a specific group in a mobile terminal according to one embodiment of the present invention.

FIG. 23 is a diagram illustrating a further different example of a method for displaying a screen including a plurality of images belonging to a specific group in a mobile terminal according to one embodiment of the present invention. In relation to FIG. 23, contents overlapped with what is mentioned earlier in FIGS. 6 to 15, and 19 are not explained again. In the following, a different point is mainly concerned.

Referring to FIG. 23 (a), the controller 180 can control the display unit 151 to display an execution screen of a specific application according to an execution command of the specific application (e.g., a gallery application). The controller 180 can control the display unit 151 to display thumbnail images corresponding to each of a plurality of the images stored in the memory 170 on the execution screen.

When the thumbnail images corresponding to each of a plurality of the images are displayed on the execution screen, the controller 180 can categorize a plurality of the images into at least one of groups (G1, G2) using at least one of location information, a captured date and captured time of a plurality of the images. And, the controller 180 can provide a prescribed visual effect to thumbnail images corresponding to each of images belonging to a same group. For instance, the controller 180 can provide an identical highlight effect to the thumbnail images corresponding to each of a plurality of the images belonging to the same group.

The controller 180 can control the display unit 151 to display a first indicator 800 including thumbnail images corresponding to each of a plurality of images belonging to the second group G2 in the vicinity of the second group G2 to which a lastly captured first image belongs among the at least one of groups (G1, G2). For instance, the controller 180 can control the display unit to display the first indicator 800 on the right of a thumbnail image A4' corresponding to the lastly captured image among a plurality of the images belonging to the second group G2.

Hence, the first indicator including thumbnail images corresponding to each of a plurality of images belonging to the first group G1 may not be displayed in the vicinity of the first group G1 to which the lastly captured first image does not belong thereto among the at least one of groups (G1, G2).

Referring to FIG. 23 (b), if a command for selecting a fourth thumbnail image A4' corresponding to a lastly captured image from a plurality of images belonging to the first group G1 is detected in FIG. 23 (a), the controller 180 can control the display unit 151 to display an image A4 corresponding to the fourth thumbnail image A4' according to the command.

Since the fourth image A4 corresponds to the firstly captured image among a plurality of the images belonging to the second group G2, the controller 180 can control the display unit 151 to display a first indicator 800 including thumbnail images corresponding to each of a plurality of the images belonging to the second group G2 on a partial region of the fourth image A4. For instance, the partial region on which the first indicator 800 is displayed may correspond to a partial region positioned at the right of the fourth image A4.

According to an embodiment, if a command for selecting the first indicator 800 is detected, the controller 180 can control the display unit 151 to display a screen including a plurality of images belonging to the first group G1. Meanwhile, according to an embodiment, if a touch command for selecting a thumbnail image corresponding to a lastly captured image from a plurality of images belonging to the first group G1 is detected in FIG. 23 (a), the controller 180 can control the display unit 151 to display an image corresponding to the selected thumbnail image according to the touch command. In this instance, since the displayed image corresponds to the lastly captured image among a plurality of the images belonging to the second group G2, the controller 180 can control the display unit 151 to display a first indicator 800 including thumbnail images corresponding to each of a plurality of the images belonging to the first group G1 on a partial region of the displayed image.

For instance, the partial region on which the first indicator 800 is displayed may correspond to a partial region positioned at the left of the displayed image. And, if a command for selecting the first indicator 800 or a touch command for touching a point of the displayed image and dragging the touch in a direction opposite to a direction at which the first indicator 800 is positioned is detected, the controller 180 can control the display unit 151 to display a screen 600 including a plurality of images A1/A2/A3/A4 belonging to the second group G2 according to the command or the touch command.

Meanwhile, according to one embodiment of the present invention, when a preview image captured by a camera is displayed, the controller 180 can control the display unit 151 to display thumbnail images corresponding to each of a plurality of images belonging to the specific group on the preview image. This will be described in more detail with reference to FIGS. 24 and 25 in the following.

FIG. 24 is a diagram illustrating an example of a method for displaying a thumbnail image corresponding to each of a plurality of images belonging to a specific group on a preview image captured by a camera of a mobile terminal according to one embodiment of the present invention. In relation to FIG. 24, contents overlapped with what is mentioned earlier in FIGS. 6 to 23 are not explained again. In the following, a different point is mainly concerned.

According to one embodiment of the present invention, the controller 180 can control the camera 121 to capture a plurality of images. Subsequently, the controller 180 can control the wireless communication unit 115 to obtain location information corresponding to each of a plurality of the images. The controller 180 can store at least one of the obtained location information, a date on which each of a plurality of the images is captured and time at which each of a plurality of the images is captured in the memory 170 together with a plurality of the images. The controller 180 can categorize a plurality of the images stored in the memory 170 into at least one of groups based on at least one of the location information, the date and the time.

Referring to FIG. 24 (a), the controller 180 can control the display unit 151 to display a preview image 1100 captured by the camera 121. When the preview image 1100 capture by the camera 121 is displayed, the controller 180 can determine whether an image captured immediately before the preview image 100 is displayed corresponds to an image belonging to the specific group. Specifically, the controller 180 can determine whether the image captured before the preview image 1000 is displayed corresponds to the image belonging to the specific group based on time at which each of a plurality of images stored in the memory 170 is captured.

If it is determined as the image captured before the preview image 1100 is displayed corresponds to the image belonging to the specific group, the controller 180 can control the display unit 151 to display a thumbnail image 1200 corresponding to a lastly captured image among images belonging to the specific group on a partial region of the preview image 1100. Subsequently, the controller 180 can control the display unit 151 to display a first indicator indicating the number of the images belonging to the specific group on the thumbnail image 1200.

The controller 180 can control the display unit 151 to display thumbnail images corresponding to each of a plurality of images belonging to the specific group and a second indicator including the thumbnail images corresponding to each of a plurality of the images on the preview image 1100 according to a first touch command. For instance, the first touch command may correspond to a touch command for touching a point of a region on which the thumbnail image 1200 is displayed and dragging the touch in the left direction.

Specifically, referring to FIG. 24 (b), the controller 180 can control the display unit 151 to display at least one or more thumbnail images 1310/1320/1330/1340 corresponding to each of a plurality of images belonging to the specific group and a second indicator 800 including thumbnail images corresponding to each of a plurality of the images on the preview image 1100.

If a command for selecting a specific thumbnail image from at least one or more thumbnail images 1310/1320/ 1330/1340 corresponding to each of a plurality of the images belonging to the specific group, which are displayed on the preview image 1100, is detected, the controller 180 can control the display unit 151 to display an image corresponding to the specific thumbnail image.

And, if a command for selecting the second indicator 800 displayed on the preview image 1100 is detected, the controller 180 can control the display unit 151 to display a screen including a plurality of the images. Since the screen is identical to what is mentioned earlier in FIGS. 6 to 15, detail explanation is omitted at this time.

Meanwhile, if there exist images of which an identical object exists at an identical position among a plurality of images belonging to the specific group, the controller 180 can control the display unit 151 to display a thumbnail image 1320 corresponding to a specific image only on the preview image 1100. In this instance, the controller 180 can randomly select the specific image from the images.

Specifically, the controller can recognize at least one of an object included in each of a plurality of the images belonging to the specific group and a position of the object. Subsequently, the controller 180 can determine whether there exist images of which the recognized object and the recognized position of the object are matched with each other among a plurality of the images belonging to the specific group. If there exits an image of which the recognized object and the recognized position of the object are matched with each other among a plurality of the images, the controller 180 can control the display unit 151 to display a thumbnail image 1320 corresponding to a specific image only on the preview image 1100 among a plurality of the images.

In particular, if there exist images identical to each other among a plurality of the images belonging to the specific group, the controller 180 can control the display unit 151 to display a thumbnail image 1320 corresponding to one image among the images identical to each other on the preview image 1100 only and control the display unit not to display thumbnail images corresponding to remaining images except the specific image among the images on the preview image 1100.

When the thumbnail image 1320 corresponding to the specific image is displayed on the preview image 1100, the controller 180 can control the display unit 151 to display a third indicator 1400 indicating the number of images of which an object and a position of the object are matched with the specific image among a plurality of the images belonging to the specific group on the thumbnail image 1320 corresponding to the specific image.

For instance, if there exist two images of which an object and a position of the object are matched with the specific image among a plurality of the images belonging to the specific group, the controller 180 can control the display unit 151 to display a third indicator 1400 indicating that there exist 2 images of which an object and a position of the object are matched with the specific image on a thumbnail image 1320 corresponding to the specific image.

According to an embodiment, the controller 180 can delete at least one or more images of which an object and a position of the object are matched with the specific image from a plurality of the images stored in the memory 170 according to a specific command detected on the thumbnail image 1320 corresponding to the specific image. For instance, the specific command may correspond to a touch command touching the thumbnail image 1320 corresponding to the specific image for more than predetermined time.

Meanwhile, if a second touch command is detected on a specific thumbnail image among at least one or more thumbnail images displayed on the preview image 1100, the controller 180 can delete an image corresponding to the specific thumbnail image from the memory 170 according to the second touch command. For instance, if a touch command for touching a point of a region on which a specific image is displayed among at least one or more thumbnail images 1310/1320/1330/1340 displayed on the preview image 1100 and dragging the touch in up direction is detected, the controller 180 can delete an image corresponding to the specific thumbnail image from the memory 170 according to the touch command.

And, if a third touch command is detected on a specific thumbnail image among at least one or more thumbnail images displayed on the preview image 110, the controller 180 can share an image corresponding to the specific thumbnail image with an external server or an external device according to the third touch command. For instance, if a touch command for touching a point of a region on which a specific thumbnail image is displayed among at least one or more thumbnail images 1310/1320/1330/1340 displayed on the preview image 1100 and dragging the touch in down direction is detected, the controller 180 can control the display unit 151 to display a selection window of an application, which is related to a function of sharing an image corresponding to the specific thumbnail image with an external server or an external device, on the preview image 1100. Since explanation on the selection window is identical to what is mentioned earlier in FIG. 7, detail explanation is omitted at this time.

Meanwhile, the controller 180 can control the display unit 151 to display a message including specific contents on a partial region 1110 of the preview image 1100 according to the first touch command. In this instance, the specific contents can include at least one of a method of deleting an image corresponding to a specific thumbnail image among at least one or more thumbnail images 1310/1320/1330/1340 displayed on the preview image 1100 and a method of sharing an image corresponding to a specific thumbnail image among at least one or more thumbnail images 1310/ 1320/1330/1340 displayed on the preview image 1100 with an external server or an external device. Yet, depending on embodiment, the controller 180 can control the display unit 151 to display the message on the partial region 1110 for prescribed time only according to the first touch command, by which the present invention may be non-limited. the controller 180 may not display the message.

FIG. 25 is a diagram illustrating an example of a screen which is displayed according to a command for selecting an image from thumbnail images respectively corresponding to a plurality of images belonging to a specific group displayed on a preview image in a mobile terminal according to one embodiment of the present invention. In relation to FIG. 25, contents overlapped with what is mentioned earlier in FIGS. 6 to 24 are not explained again. In the following, a different point is mainly concerned.

The controller 180 can control the display unit 151 to display a preview image 1100 captured by the camera 121. When the preview image 1100 is displayed, the controller 180 can determine whether an image captured before the preview image 100 is displayed corresponds to an image belonging to the specific group. If it is determined as the image captured before the preview image 1100 is displayed corresponds to the image belonging to the specific group, the controller 180 can control the display unit 151 to display a thumbnail image corresponding to a lastly captured image among images belonging to the specific group on a partial region of the preview image 110.

Referring to FIG. 25 (*a*), if a touch command for touching a point of a region on which the thumbnail image 1200 is displayed and dragging the touch in left direction is detected, the controller 180 can control the display unit 151 to display at least one or more thumbnail images 1310/1320/1330/1340 corresponding to each of a plurality of the images belonging to the specific group and a first indicator 800 including thumbnail images corresponding to each of a plurality of the images on the preview image 1100 according to the touch command.

Referring to FIG. 25 (*b*), if a command for selecting a specific thumbnail 1310 from at least one or more thumbnail images 1310/1320/1330/1340 corresponding to each of a plurality of the images belonging to the specific group, which are displayed on the preview image 1100, is detected, the controller 180 can control the display unit 151 to display an image 1310' corresponding to the specific thumbnail image 1310 according to the command.

When the image 1310' corresponding to the specific thumbnail image 1310 is displayed, among the at least one or more thumbnail images 1310/1320/1330/1340 corresponding to each of a plurality of the images belonging to the specific group, the controller 180 can control the display unit 151 to display at least one or more thumbnail images 1320/1330/1340 except the specific thumbnail image 1310 on a partial region of the image 1310'. And, the controller 180 can control the display unit 151 to display a first indicator 800 including a plurality of the images belonging to the specific group and a second indicator 1500 corresponding to a function of activating the camera on the image 1310'.

Meanwhile, if there exist images of which an object is positioned at an identical position among a plurality of the images belonging to the specific group, the controller 180 can control the display unit 151 to display a thumbnail image 1320 corresponding to a specific image only on the image 1310' among the images. In this instance, the controller 180 can randomly select the specific image from the images.

Specifically, the controller 180 can recognize at least one of an object included in each of a plurality of the images belonging to the specific group and a position of the object. The controller 180 can recognize whether there exist images of which the recognized object and the recognized position of the object are matched with each other among a plurality of the images belonging to the specific group. If there exist the images of which the recognized object and the recognized position of the object are matched with each other among a plurality of the images, the controller 180 can control the display unit 151 to display a thumbnail image 1320 only corresponding to a specific image among the images on the image 1310'. In particular, if identical images exist in a plurality of the images belonging to the specific group, the controller 180 can control the display unit 151 to display the thumbnail image 1320 corresponding to an image among the identical images on the image 1310' and control the display unit 151 not to display thumbnail images corresponding to the remaining images among the images except the specific image.

When the thumbnail image 1320 corresponding to the specific image is displayed on the image 1310', the controller 180 can control the display unit 151 to display a third indicator 1400 indicating the number of at least one or more images of which an object and a position of the object are matched with the specific image among a plurality of the images belonging to the specific group on the thumbnail image 1320 corresponding to the specific image.

For instance, if there exist two images of which an object and a position of the object are matched with the specific image among a plurality of the images belonging to the specific group, the controller 180 can control the display unit 151 to display a third indicator 1400 indicating that there exist 2 images of which an object and a position of the object are matched with the specific image on the thumbnail image 1320 corresponding to the specific image.

According to an embodiment, the controller 180 can delete at least one or more images of which an object and a position of the object are matched with the specific image from a plurality of the images stored in the memory 170 according to a specific command detected on the thumbnail image 1320 corresponding to the specific image. For instance, the specific command may correspond to a touch command touching the thumbnail image 1320 corresponding to the specific image for more than predetermined time.

The controller 180 can control the display unit 151 to display a screen including a plurality of the images according to a command for selecting the first indicator 800 displayed on the image 1310'. Since explanation on the screen is identical to what is mentioned earlier in FIGS. 6 to 15, detail explanation on the screen is omitted at this time.

Meanwhile, the controller 180 can control the display unit 151 to display the preview image captured by the camera 121 again according to a command for selecting the second indicator 1500. Specifically, the controller 180 can activate the camera 121 according to the command for selecting the second indicator 1500. Subsequently, the controller 180 can control the display unit 151 to display the preview image captured by the activated camera 121.

A mobile terminal and method for controlling the same according to an embodiment of the present invention provides the following effects and/or features.

According to at least one or more embodiments of the present invention, it can categorize a plurality of images stored in a memory into at least one of groups using a location at which a plurality of the images are captured, time at which a plurality of the images are captured and a date on which a plurality of the images are captured and display a plurality of images belonging to a specific group only among the at least one of groups according to a specific command. By doing so, a user can easily identify images included in a plurality of the images belonging to the specific group.

According to at least one or more embodiments of the present invention, it can enable a user to intuitively recognize images of which a subject is captured well and images of which a subject is captured unnaturally among images captured on identical timeline, identical date and an identical location.

According to at least one or more embodiments of the present invention, it can enable a user to easily execute a specific function (e.g., a function of deleting an image, a function of sharing an image with an external device or an external server) for at least one or more images among a plurality of images belonging to a specific group.

According to the at least one or more aforementioned embodiments of the present invention, a user can easily identify an image included in a plurality of images belonging to the specific group by categorizing a plurality of the images stored in the memory into at least one of groups using a location at which each of a plurality of the image are captured, time at which each of a plurality of the image are captured and a date on which each of a plurality of the image are captured and displaying a plurality of images belonging to a specific group only according to a specific command detected on the specific group among the at least one of groups. And, according to the at least one or more aforementioned embodiments of the present invention, a user can intuitively recognize images of which a subject is captured well and images of which a subject is captured unnaturally among images captured at an identical timeline, an identical date and an identical location.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a display unit;
a camera configured to capture a plurality of images;
a wireless communication unit configured to obtain location information corresponding to each of the plurality of the images;
a memory configured to store at least one of the location information, a date on which each of the plurality of the images is captured, and a time at which each of the plurality of the images is captured together with the plurality of the images; and
a controller configured to:
display a group of images having a same date, a same location and being captured within a predetermined time range, in response to a first command,
sequentially arrange the group of images according to a predetermined image quality condition different than the at least one of the location information, the date and the time, and
display a camera indicator only on at least one first image of the group of images that does not meet or exceed the predetermined image quality condition, the camera indicator being for capturing a new image to be included in the group of images.

2. The mobile terminal of claim 1, wherein the predetermined image quality condition comprises a focus of a corresponding image.

3. The mobile terminal of claim 1, wherein the controller is further configured to sequentially arrange the group of images such that images with a better focus are displayed before images with a lesser focus.

4. The mobile terminal of claim 1, wherein the controller is further configured to display an image quality condition indicator on a corresponding image indicating an image quality of the corresponding image.

5. The mobile terminal of claim 1, wherein the controller is further configured to display a sharing indicator only on at least one second image of the group of images that meets or exceeds the predetermined image quality condition, the sharing indicator indicating that the at least one second image can be shared with an external terminal.

6. The mobile terminal of claim 5, wherein the controller is further configured to display a delete indicator only on the at least one first image that does not meet or exceed the predetermined image quality condition.

7. The mobile terminal of claim 1, wherein the controller is further configured to:
in response to a selection of the camera indicator, display a preview image captured by the camera on a specific position of the touch screen corresponding to a position of the at least one first image corresponding to the selected camera indicator.

8. The mobile terminal of claim 1, wherein the first command corresponds to touching and dragging an image having an earliest capture time or a latest capture time among the group of images.

9. The mobile terminal of claim 1, wherein the first command corresponds to touching a thumbnail indicator containing thumbnail images corresponding to the group of images on a partial region of an image having an earliest capture time or a latest capture time among the group of images.

10. The mobile terminal of claim 1, wherein the controller is further configured to control a display size of each image included in the group of images according to a number of images included in the group of images.

11. The mobile terminal of claim 1, wherein the controller is further configured to display only one image among multiple images in the group that have a same object at a same position in the multiple images.

12. The mobile terminal of claim 11, wherein the controller is further configured to display a count indicator indicating a number of the multiple image in the group that have the same object at the same position in the multiple images.

13. A method of controlling a mobile terminal, the method comprising:
capturing, via a camera, a plurality of images;
obtaining, via a wireless communication unit, location information corresponding to each of the plurality of the images;
storing, via a memory, at least one of the location information, a date on which each of the plurality of the images is captured and time at which each of the plurality of the images is captured together with the plurality of the images;

displaying, via a touch screen, a group of images having a same date, a same location and being captured within a predetermined time range, in response to a first command;

sequentially arranging, via a controller, the group of images according to a predetermined image quality condition different than the at least one of the location information, the date and the time; and displaying a camera indicator only on at least one first image of the group of images that does not meet or exceed the predetermined image quality condition, the camera indicator being for capturing a new image to be included in the group of images.

14. The method of claim 13, wherein the predetermined quality condition comprises a focus of a corresponding image.

15. The method of claim 13, further comprising:
sequentially arranging the group of images such that images with a better focus are displayed before images with a lesser focus.

16. The method of claim 13, further comprising:
displaying an image quality condition indicator on a corresponding image indicating an image quality of the corresponding image.

17. The method of claim 13, further comprising:
displaying the sharing indicator only on at least one second image of the group of images that meets or exceeds the predetermined image quality condition.

* * * * *